United States Patent
Kumar Agrawal et al.

(10) Patent No.: US 11,907,495 B2
(45) Date of Patent: Feb. 20, 2024

(54) ELECTRONIC DEVICES AND CORRESPONDING METHODS UTILIZING ULTRA-WIDEBAND COMMUNICATION SIGNALS FOR USER INTERFACE ENHANCEMENT

(71) Applicant: Motorola Mobility LLC, Chicago, IL (US)

(72) Inventors: Amit Kumar Agrawal, Bangalore (IN); Michael E Russell, Lake Zurich, IL (US); Gautham Natakala Prabhakar, Bangalore (IN)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 17/505,455

(22) Filed: Oct. 19, 2021

(65) Prior Publication Data

US 2023/0119256 A1    Apr. 20, 2023

(51) Int. Cl.
| G06F 17/00 | (2019.01) |
| G06F 3/04812 | (2022.01) |
| G06F 3/0482 | (2013.01) |
| H04L 67/52 | (2022.01) |

(52) U.S. Cl.
CPC ........ *G06F 3/04812* (2013.01); *G06F 3/0482* (2013.01); *H04L 67/52* (2022.05)

(58) Field of Classification Search
CPC ..... G06F 3/04812; G06F 3/0482; H04L 67/52
See application file for complete search history.

(56) References Cited

U.S. PATENT DOCUMENTS

| 8,913,026 | B2* | 12/2014 | Yoo | G06F 9/452 |
| | | | | 345/173 |
| 9,535,567 | B1* | 1/2017 | Bagrinovskiy | G06F 3/04845 |
| 9,766,849 | B2* | 9/2017 | Kim | G06F 3/0346 |
| 10,509,116 | B2* | 12/2019 | McLaughlin | G01S 13/0209 |
| 10,779,427 | B2* | 9/2020 | Lee | H04M 1/0202 |
| 10,841,174 | B1* | 11/2020 | Ely | G02B 27/0172 |
| 10,890,644 | B1* | 1/2021 | Berger | G01S 13/74 |

(Continued)

OTHER PUBLICATIONS

Blackman, James, "New kid on the IoT block—fine-ranging with UWB and what it means for IoT", Published online Jul. 8, 2020 at https://enterpriseiotinsights.com/20200708/channels/fundamentals/fine-ranging-with-uwb-and-what-it-means-for-iot.

(Continued)

*Primary Examiner* — Mohammed H Zuberi
(74) *Attorney, Agent, or Firm* — Philip H. Burrus, IV

(57) ABSTRACT

One or more processors of an electronic device detect a communication device electronically in communication with a content presentation companion device operating as a primary display for the electronic device and including a first ultra-wideband component. The one or more processors determine, with a second ultra-wide component carried by the electronic device, a distance between the electronic device and the content presentation companion device using an ultra-wideband ranging process. The one or more processors then dynamically enhance a user interface of the content presentation companion device as a function of the distance between the electronic device and the content presentation companion device. The enhancing adjusts a user interface feature being presented on the content presentation companion device.

20 Claims, 12 Drawing Sheets

(56) References Cited

U.S. PATENT DOCUMENTS

| | | | |
|---|---|---|---|
| 11,061,744 B2* | 7/2021 | Louch | G06F 3/03545 |
| 11,119,574 B1* | 9/2021 | Moussette | G06F 3/0412 |
| 11,128,342 B2* | 9/2021 | McLaughlin | G01S 5/12 |
| 11,262,968 B2* | 3/2022 | Tian | G06F 3/1454 |
| 11,363,500 B1* | 6/2022 | Matsimanis | H04W 4/50 |
| 2009/0284532 A1* | 11/2009 | Kerr | G06F 3/0481 |
| | | | 345/442 |
| 2010/0090964 A1* | 4/2010 | Soo | G06F 3/04845 |
| | | | 345/173 |
| 2010/0251171 A1 | 9/2010 | Parulski | |
| 2010/0299436 A1* | 11/2010 | Khalid | G06F 3/04886 |
| | | | 709/226 |
| 2011/0112819 A1* | 5/2011 | Shirai | G06F 3/1454 |
| | | | 703/21 |
| 2011/0276911 A1* | 11/2011 | Choi | G06F 9/452 |
| | | | 715/835 |
| 2012/0084663 A1* | 4/2012 | Momchilov | G06F 3/1454 |
| | | | 715/744 |
| 2012/0147246 A1* | 6/2012 | Dent | H04N 23/62 |
| | | | 348/333.12 |
| 2012/0315887 A1* | 12/2012 | Konishi | H04M 1/72415 |
| | | | 455/420 |
| 2013/0179825 A1* | 7/2013 | Seo | H04L 67/025 |
| | | | 715/778 |
| 2013/0234984 A1* | 9/2013 | Yoo | H04N 21/4222 |
| | | | 345/174 |
| 2013/0252600 A1* | 9/2013 | Seo | G06F 3/023 |
| | | | 455/420 |
| 2014/0132499 A1 | 5/2014 | Schlesinger | |
| 2014/0229852 A1* | 8/2014 | Lee | G06F 3/1423 |
| | | | 715/748 |
| 2015/0120817 A1* | 4/2015 | Jeong | H04L 67/10 |
| | | | 709/203 |
| 2015/0201234 A1* | 7/2015 | Hayakawa | G06F 13/00 |
| | | | 725/35 |
| 2016/0103653 A1* | 4/2016 | Jang | H03G 3/02 |
| | | | 381/107 |
| 2016/0112839 A1* | 4/2016 | Choi | H04W 4/80 |
| | | | 455/41.2 |
| 2016/0249006 A1* | 8/2016 | Park | H04N 21/42204 |
| 2016/0259531 A1* | 9/2016 | Cho | G06Q 20/321 |
| 2016/0306762 A1* | 10/2016 | Lee | H02J 50/10 |
| 2016/0364200 A1* | 12/2016 | Beveridge | H04L 12/4633 |
| 2017/0085293 A1* | 3/2017 | Marrow | H04B 1/71637 |
| 2017/0139549 A1* | 5/2017 | Goldstein | G06F 9/453 |
| 2017/0351531 A1* | 12/2017 | Li | G06F 3/1454 |
| 2017/0357477 A1* | 12/2017 | Im | H04W 76/10 |
| 2018/0139405 A1* | 5/2018 | Baek | H04N 21/84 |
| 2018/0284967 A1* | 10/2018 | Lee | G06F 3/04812 |
| 2019/0156788 A1* | 5/2019 | Lee | H04M 1/72409 |
| 2019/0220500 A1* | 7/2019 | Dhaundiyal | G06F 3/048 |
| 2019/0347069 A1* | 11/2019 | Park | G06F 3/167 |
| 2020/0154583 A1* | 5/2020 | Lee | H05K 5/0247 |
| 2020/0289934 A1* | 9/2020 | Azmandian | G06F 3/0346 |
| 2021/0344804 A1* | 11/2021 | Watariuchi | H04N 1/00408 |
| 2022/0304084 A1* | 9/2022 | Ahmed | H04W 28/22 |

OTHER PUBLICATIONS

Mayo, Benjamin, "iOS 15 brings back the magnifying glass for accurate text selection", Published Jun. 7, 2021 on 9To5Mac; Viewed online at https://9to5mac.com/2021/06/07/ios-15-brings-back-the-magnifying-glass-for-accurate-text-selection/.

Russell, Brandon, "Galaxy S 21 Features Wireless Support fo Samsung DeX on PC", Published Online Feb. 5, 2021 at https://www.xda-developers.com/galaxy-s21-wireless-support-samsung-dex-on-pc/.

Johnson, Gerald, "NonFinal Office Action", U.S. Appl. No. 17/505,456, filed Oct. 19, 2021; dated Nov. 25, 2022.

Montoya, Oschta I. "Notice of Allowance", U.S. Appl. No. 17/505,457, filed Oct. 19, 2021; dated Aug. 3, 2022.

Johnson, Gerald, "Notice of Allowance", U.S. Appl. No. 17/505,456, filed Oct. 19, 2021; dated Jan. 19, 2023.

Philpott, Matthew, "Search Report", GB2214885.2; dated Mar. 28, 2023.

* cited by examiner

ELECTRONIC DEVICES AND CORRESPONDING METHODS UTILIZING ULTRA-WIDEBAND COMMUNICATION SIGNALS FOR USER INTERFACE ENHANCEMENT

BACKGROUND

Technical Field

This disclosure relates generally to electronic devices, and more particularly to electronic devices operable with companion electronic devices.

Background Art

The technology associated with portable electronic devices, such as smartphones and tablet computers, is continually improving. Illustrating by example, while not too long ago such devices included only grey scale liquid crystal diode displays with large, blocky pixels, modern smartphones, tablet computers, and even smart watches include vivid organic light emitting diode (OLED) displays with incredibly small pixels.

While these OLED displays offer extremely high contrast ratios capable of presenting high dynamic range images and videos, their size remains limited so that these devices can be easily carried in a hand, pocket, or backpack. To enable content received by these devices to be more easily seen, some portable electronic devices include a content redirection feature. Using the content redirection feature, content may stream through a portable electronic device such as a smartphone, but then be redirected to a larger display. While great for watching content, the user interface settings associated with the larger display are generally static. Making adjustments can require multiple steps and can be tedious and time consuming. It would be advantageous to have an improved electronic device with enhanced user interface features.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present disclosure.

Figure 1:
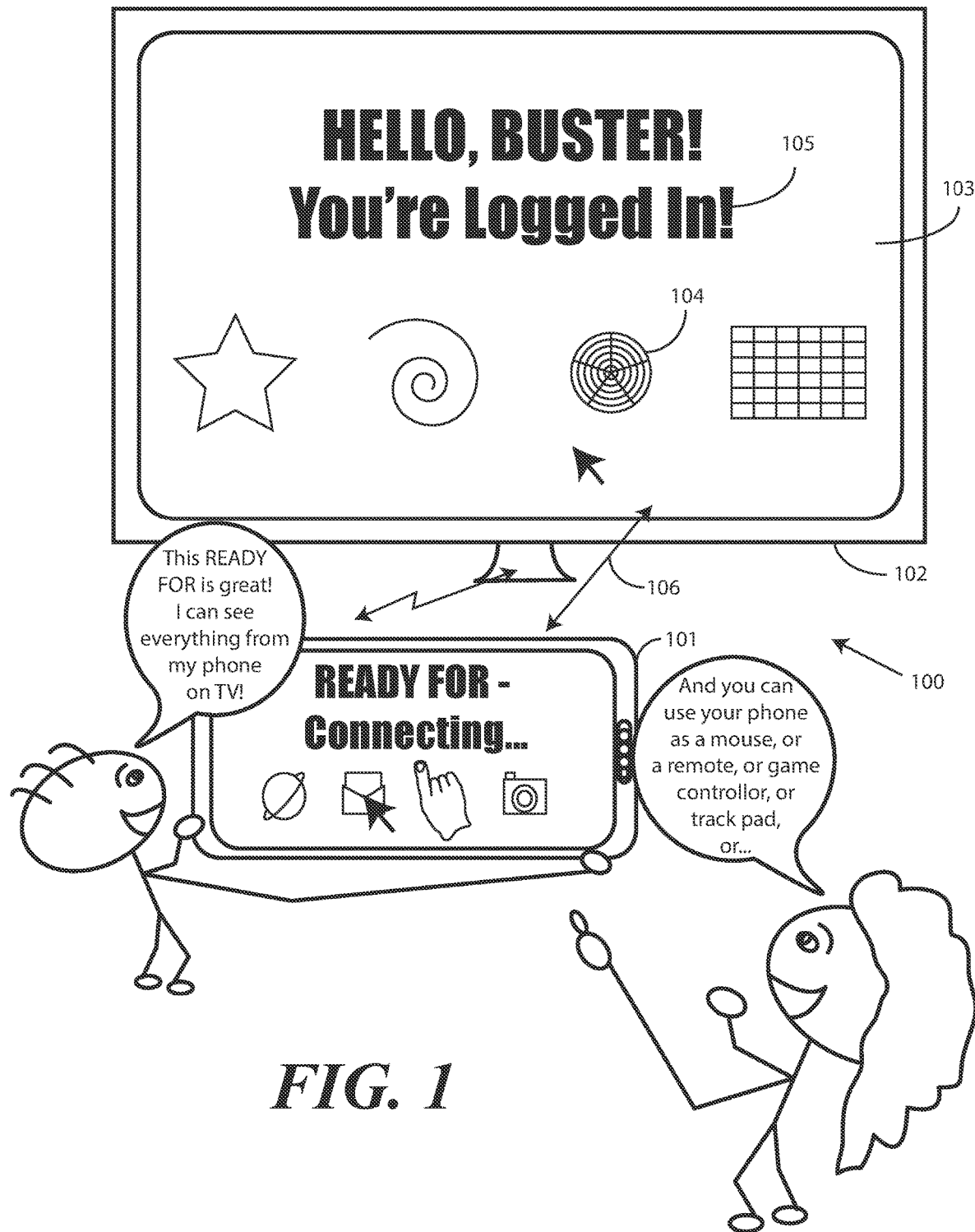
FIG. 1 illustrates one explanatory system in accordance with one or more embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related to dynamically enhancing a user interface of a content presentation companion device as a function of a distance between an electronic device and the content presentation companion device. Any process descriptions or blocks in flow charts should be understood as representing modules, segments, or portions of code that include one or more executable instructions for implementing specific logical functions or steps in the process.

Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

Embodiments of the disclosure do not recite the implementation of any commonplace business method aimed at processing business information, nor do they apply a known business process to the particular technological environment of the Internet. Moreover, embodiments of the disclosure do not create or alter contractual relations using generic computer functions and conventional network operations. Quite to the contrary, embodiments of the disclosure employ methods that, when applied to electronic device and/or user interface technology, improve the functioning of the electronic device itself by and improving the overall user experience to overcome problems specifically arising in the realm of the technology associated with electronic device user interaction.

It will be appreciated that embodiments of the disclosure described herein may be comprised of one or more conventional processors and unique stored program instructions that control the one or more processors to implement, in conjunction with certain non-processor circuits, some, most, or all of the functions of dynamically enhancing a user interface of a content presentation companion device as a function of a distance between an electronic device and the content presentation companion device and/or enhancing an audio performance characteristic as a function of the distance between an electronic device and a content presentation companion device as described below. The non-processor circuits may include, but are not limited to, a radio receiver, a radio transmitter, signal drivers, clock circuits, power source circuits, and user input devices. As such, these functions may be interpreted as steps of a method to perform the enhancing the user interface or an audio performance characteristic of a content presentation companion device.

Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ASICs with minimal experimentation.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions.

As used herein, components may be "operatively coupled" when information can be sent between such components, even though there may be one or more intermediate or intervening components between, or along the connection path. The terms "substantially", "essentially", "approximately", "about" or any other version thereof, are defined as being close to as understood by one of ordinary skill in the art, and in one non-limiting embodiment the term is defined to be within ten percent, in another embodiment within five percent, in another embodiment within one percent and in another embodiment within one-half percent. The term "coupled" as used herein is defined as connected, although not necessarily directly and not necessarily mechanically. Also, reference designators shown herein in parenthesis indicate components shown in a figure other than the one in discussion. For example, talking about a device (10) while discussing figure A would refer to an element, 10, shown in figure other than figure A.

As noted above, some modern portable electronic devices are equipped with a content redirection feature. Using smartphones manufactured by Motorola Mobility.sup.™ as one illustrative example, some models are equipped with their Ready For.sup.™, which is a feature that allows the Ready For.sup.™ device to connect to a content presentation companion device such as a larger monitor, television, or other device having a larger screen. Using the Ready For.sup.™ feature, users can wirelessly stream video content to the larger display of a content presentation companion device with no loss in performance. Resolution of the images on the content presentation companion device is up to 4K with a frame rate that presents content without flicker or distortion. Moreover, neither a cable nor a docking station is required to use the Ready For.sup.™ feature. When using the feature, the smartphone can be used as a mouse, trackpad, or other control device while content is being presented on the content presentation companion device. The Ready For.sup.™ feature can be used for presenting pictures, videos, television shows, or movies on the larger display of a content presentation companion device. Additionally, it can be used for gaming, video conferences, and other content presentation tasks.

While such content redirection features work well in practice, their user interface settings are generally static. Accordingly, the mouse pointer size remains constant regardless of the relationship between the smartphone and the content presentation companion device. The mouse pointer speed remains constant as well, as does the display resolution, the display size, font sizes, and other visible user interface settings. Moreover, audio control settings are static as well, which can lead to audio lag and acoustic artifact issues.

While there have been some attempts at increasing visible objects such as mouse pointers and fonts so that they can be seen from greater distances, these attempts are insufficient due to the large range at which a portable electronic device can be used to control a content presentation companion device. Embodiments of the disclosure contemplate that the distance between a portable electronic device and a content presentation companion device within which a content redirection feature can be anywhere from one to two feet up to several tens of feet.

What's more, generally the sizes of any windows that might appear on a content presentation companion device when using a content redirection feature are determined by the overall display size. Adjustment of these sizes can be tedious and complex. Moreover, clickable icons and user actuation targets tend to be packed next to each other making selection and actuation of the same difficult. Some users even end up choosing the wrong option when they are operating the electronic device controlling the content presentation companion device at a distance. This only adds to user frustration and increases pain points associated with traditional content redirection features.

Advantageously, embodiments of the disclosure provide a more intelligent system that dynamically enhances one or both of a user interface and/or an audio performance characteristic of a content presentation companion device as a function of a distance between an electronic device and the content presentation companion device. For instance, in one or more embodiments a user interface feature being presented on a content presentation companion device can be adjusted as the function of the distance. In other embodiments, a magnification tool can enhance the user interface as a function of the distance. In still other embodiments, an audio performance characteristic of the content presentation companion device can be enhanced as a function of the distance. Other user interface enhancements will be described below. Still others will be obvious to those of ordinary skill in the art having the benefit of this disclosure.

In one or more embodiments, the user interface and audio performance characteristics are enhanced by determining a nearly exact distance between the electronic device controlling a content presentation companion device and the content presentation companion device itself. In one or more embodiments, an ultra-wideband component determines a distance, using ultra-wideband ranging processes, between an electronic device carrying an ultra-wideband component and a content presentation companion device, which includes its own an ultra-wideband component. When one or more processors of an electronic device determine that an electronic device is in communication with a content presentation companion device using a content redirection feature, the one or more processors determine the distance between the content presentation companion device and the electronic device using ultra-wideband communications.

From this distance measurement, elements such as mouse pointer size, mouse pointer speed, display resolution, display font size, and audio lag adjustments can be made.

Thereafter, in one or more embodiments one or more motion sensors carried by the electronic device can determine when the electronic device moves relative to the content presentation companion device. When this occurs, the one or more processors can repeat the distance determination and the user interface adjustment. Embodiments of the disclosure advantageously enhance the user interface of a content presentation companion device dynamically based upon determining the exact distance between an electronic device controlling a content presentation companion device and the content presentation companion device itself.

In one or more embodiments, an ultra-wideband angle of arrival measurement can be made to determine an orientation of the electronic device in three-dimensional space relative to the content presentation companion device. Illustrating by example, the ultra-wideband angle of arrival measurement can be used to determine whether a person holding an electronic device controlling a content presentation companion device is facing the content presentation companion device or is facing away from the content presentation companion device (as may be the case when the person is presenting to an audience using the content presentation companion device as a presentation tool). In one or more embodiments, one or more processors of the electronic device can cause the content presentation companion device to enter an edit or pointer mode when the person is facing the content presentation companion device, while causing the content presentation companion device to enter a presentation mode when the user is facing away from the content presentation companion device.

In one or more embodiments, various user interface presentation characteristics can change as a function of the distance between the electronic device and the content presentation companion device. In one or more embodiments, a mouse pointer size is adjusted, with the mouse pointer size being larger when the electronic device is further from the content presentation companion device than when the electronic device is closer to the content presentation companion device. In another embodiment, a mouse pointers speed is adjusted as a function of the distance between the electronic device and the content presentation companion device, with the mouse pointer speed being greater when the electronic device is closer to the content presentation companion device than when the electronic device is farther from the content presentation companion device.

In another embodiment, the display resolution is adjusted as a function of the distance between the electronic device and the content presentation companion device. The resolution can change in different ways. As used herein, "resolution" defines how many pixels of data per inch are used to render a corresponding per inch segment of a display. Thus, with a higher resolution, the smaller user interface elements become, and vice versa, as the display are adapted. This happens, for example, with windows, display elements, and fonts.

Accordingly, in one or more embodiments display resolution is adjusted as a function of the distance between the electronic device and the content presentation companion device, with the display resolution being lower when the electronic device is farther from the content presentation companion device than when the electronic device is closer to the content presentation companion device. In still other embodiments, the display and font size are adjusted as a function of the distance between the electronic device and the content presentation companion device, with the display and font size being larger when the electronic device is farther from the content presentation companion device than when the electronic device is closer to the content presentation companion device, and so forth.

In still other embodiments, audio lag adjustments can be implemented as a function of the distance between the electronic device and the content presentation companion device, with audio lag becoming less when the electronic device is closer to the content presentation companion device than when the electronic device is farther from the content presentation companion device. In still other embodiments, where universal wideband ranging and angle of arrival measurements are made, these measurements can be combined to smooth a mouse pointer response on the display of the content presentation companion device and/or to adjust sensitivity of the mouse pointer response. As the display of the content presentation companion device begins to consume smaller cones relative to movement of the electronic device at greater distance, a smaller movement of the electronic device will result in the mouse moving across a larger portion of the display of the content presentation companion device, and so forth.

In an embodiment, based on the determining the exact distance between the content presentation companion device and the electronic device controlling the content presentation companion device the optimal size of opening any window in freeform may be adjusted. Additionally, the freeform window size can change as the distance changes. Illustrating by example, if the electronic device initially opens a window of size 5×5, movement of the electronic device a little farther from the content presentation companion device can increase the freeform window size to, say, 8×8. In other embodiments, a magnifying glass experience is created when the mouse pointer hovers near the items which have more than one clickable user interface elements packed next to each other.

Effectively, embodiments of the disclosure enhance the user interface dynamically based on determining the exact distance between the content presentation and the user using ultra-wideband technology. Of particular interest is that embodiments of the disclosure employ ultra-wideband technology, thereby leveraging the granularity of location accuracy that can be determined to solve specific user interface presentation characteristics associated with content redirection features.

In one or more embodiments, a method in an electronic device comprises detecting, with one or more processors, a communication device electronically in communication with a content presentation companion device operating as a primary display for the electronic device and comprising a first ultra-wideband component. The method then determines, with a second ultra-wide component carried by the electronic device, a distance between the electronic device and the content presentation companion device using an ultra-wideband ranging process. In one or more embodiments, the method then dynamically enhances, with the one or more processors, a user interface of the content presentation companion device as a function of the distance between the electronic device and the content presentation companion device, with the enhancing adjusting a user interface feature being presented on the content presentation companion device.

In one or more embodiments, a method in an electronic device comprises detecting, with one or more processors, a communication device electronically in communication with a content presentation companion device operating as a primary display for the electronic device and comprising a first ultra-wideband component. The method then includes determining, with a second ultra-wideband tag component carried by the electronic device, a distance between the electronic device and the content presentation companion device using an ultra-wideband ranging process. In one or more embodiments, the method dynamically enhances, with one or more processors, a user interface of the content presentation companion device as a function of the distance between the electronic device and the content presentation companion device, with the enhancing magnifying a user interface element being presented on the content presentation companion device.

In one or more embodiments, a method in an electronic device comprises detecting, with one or more processors, a communication device electronically in communication with a content presentation companion device operating as a primary display for the electronic device and comprising a first ultra-wideband component. The method then determines, with a second ultra-wideband tag component carried by the electronic device, a distance between the electronic device and the content presentation companion device using an ultra-wideband ranging process. In one or more embodiments, the method then dynamically enhances, with one or more processors, an audio performance characteristic of the content presentation companion device as a function of the distance between the electronic device and the content presentation companion device.

Turning now to FIG. 1, illustrated therein is one explanatory system 100 configured in accordance with one or more embodiments of the disclosure illustrating an electronic device 101 operating in conjunction with a content presentation companion device 102 in accordance with one or more embodiments of the disclosure. In FIG. 1, the electronic device 101 and the content presentation companion device 102 operate in tandem as a system, with the electronic device 101 providing the processing power while the content presentation companion device 102 serves as a primary display device for the electronic device 101.

As shown in FIG. 1, the electronic device 101 is electronically in communication with the content presentation companion device 102. When the electronic device 101 is electronically in communication with the content presentation companion device 102, this allows the electronic device 101 to use the larger display 103 of the content presentation companion device 300 to present content. Illustrating by example, in one or more embodiments the electronic device 101 can operate in a "content redirection" mode by presenting content such as movies, videos, images, and even a traditional computer user interface, on the display 103 of the content presentation companion device 102.

Embodiments of the disclosure contemplate that with the advanced computing power available in smartphones and other electronic devices, users often consume movies, videos, television shows, and other content using these devices. Additionally, they can perform work operations such as sending email, managing files, working on documents and spreadsheets, and so forth. By establishing an electronic communication channel between the electronic device 101 and the content presentation companion device 102, the processing power of the electronic device 101 can be leveraged to present content on the display 103 of the content presentation companion device 102. This allows a user to watch television, play video games, work on homework or office work, video call friends and family, or perform other tasks using the one or more processors of the electronic device 101 combined with the large display 103 of the content presentation companion device 102.

Using a content redirection feature, a small electronic device 101 such as the smartphone shown in FIG. 1 can connect to connect to a content presentation companion device 102 such as a larger monitor, television, or other device having a larger screen. Using the content redirection feature, users can wirelessly stream video content to the larger display 103 of the content presentation companion device 102 with no loss in performance. Resolution of the images 104 on the content presentation companion device 102 can be as high as 4K with frame rates that present the content 105 without flicker or distortion. In the illustrative embodiment of FIG. 1, neither a cable nor a docking station is required to use the content redirection feature.

When using the content redirection feature, the electronic device 101 can function as a mouse, trackpad, or other control device while the content 105 is being presented on the content presentation companion device 102. The content redirection feature can be used for presenting pictures, videos, television shows, or movies on the larger display 103 of a content presentation companion device 102. Additionally, it can be used for gaming, video conferences, and other content presentation tasks.

Embodiments of the disclosure advantageously provide a more intelligent system that dynamically enhances one or both of a user interface and/or an audio performance characteristic of the content presentation companion device 102, when operating in conjunction with the content redirection feature, as a function of a distance 106 between the electronic device 101 and the content presentation companion device 102. For instance, in one or more embodiments a user interface feature being presented on the content presentation companion device 102 can be adjusted as the function of the distance 106. In other embodiments, a magnification tool can enhance the user interface as a function of the distance 106. In still other embodiments, an audio performance characteristic of the content presentation companion device 102 can be enhanced as a function of the distance 106. These user interface features are illustrative only, as other user interface enhancements will be obvious to those of ordinary skill in the art having the benefit of this disclosure.

Before turning to the user interface enhancements and how they are provided a deeper look into the hardware of the electronic device 101 and the content presentation companion device 102 will be provided. Beginning with the electronic device 101, and turning now to FIG. 2, illustrated therein is one explanatory electronic device 200 configured in accordance with one or more embodiments of the disclosure.

Figure 2:
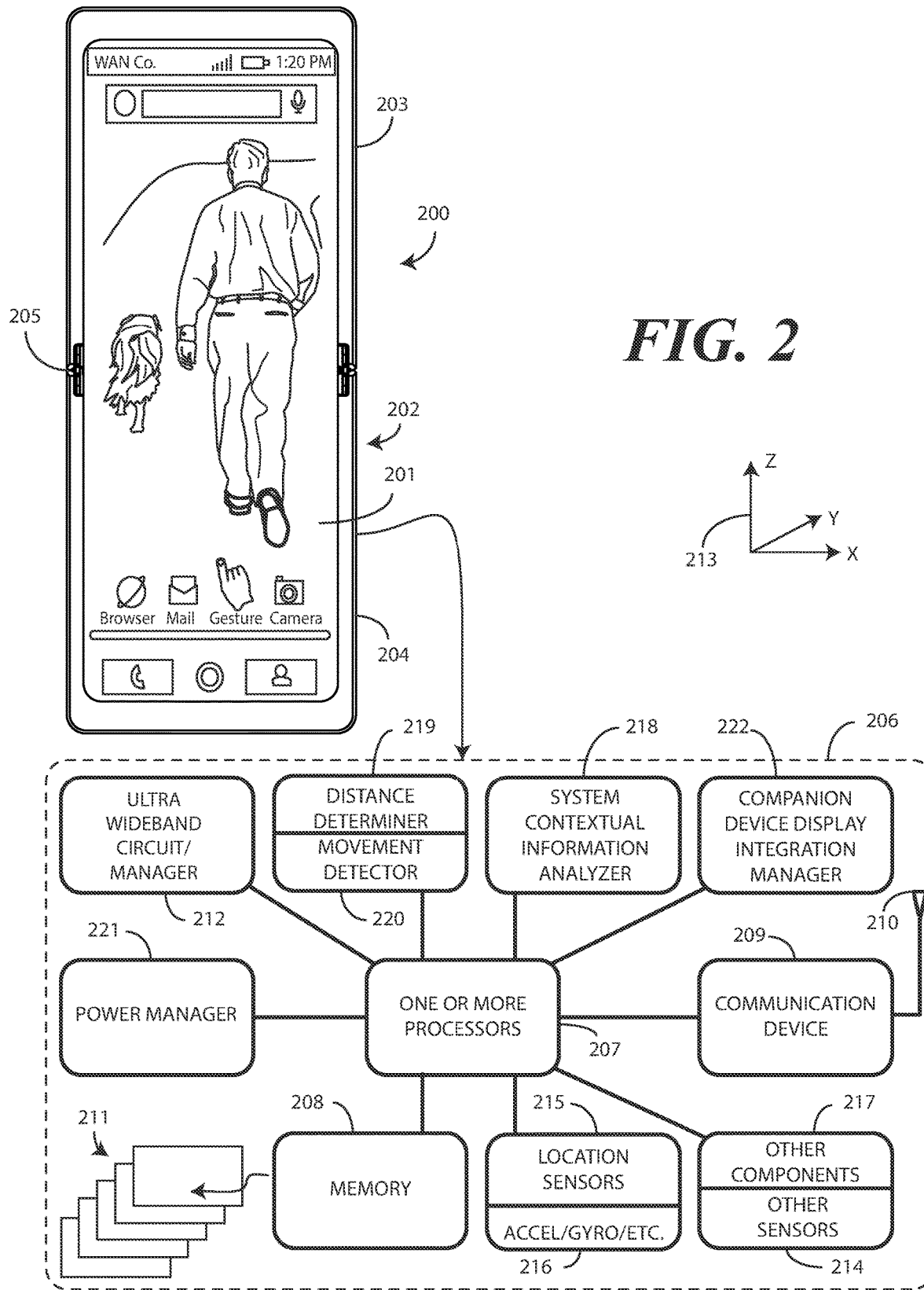
FIG. 2 illustrates one explanatory electronic device in accordance with one or more embodiments of the disclosure.

The electronic device 200 of FIG. 2 is a portable electronic device and is shown as a smartphone for illustrative purposes. However, it should be obvious to those of ordinary skill in the art having the benefit of this disclosure that other electronic devices may be substituted for the explanatory smart phone of FIG. 2. For example, the electronic device 200 could equally be a conventional desktop computer, palm-top computer, a tablet computer, a gaming device, a media player, or other device.

This illustrative electronic device 200 includes a display 201, which may optionally be touch-sensitive. Users can deliver user input to the display 201, which serves as a user interface for the electronic device 200. In one embodiment, users can deliver user input to the display 201 of such an embodiment by delivering touch input from a finger, stylus, or other objects disposed proximately with the display 201. In one embodiment, the display 201 is configured as an active-matrix organic light emitting diode (AMOLED) display. However, it should be noted that other types of displays, including liquid crystal displays, would be obvious to those of ordinary skill in the art having the benefit of this disclosure.

The explanatory electronic device 200 of FIG. 2 also includes a device housing 202. In one embodiment, the device housing 202 includes two housing members, namely, a first device housing 203 that is coupled to a second device housing 204 by a hinge 205 such that the first device housing 203 is pivotable about the hinge 205 relative to the second device housing 204 between a closed position and an axially displaced open position. In other embodiments, such as that associated with the electronic device (101) of FIG. 1, the device housing 202 will be rigid and will include no hinge.

In still other embodiments, the device housing 202 will be manufactured from a flexible material such that it can be bent and deformed. Where the device housing 202 is manufactured from a flexible material or where the device housing 202 includes a hinge, the display 201 can be manufactured on a flexible substrate such that it bends. In one or more embodiments, the display 201 is configured as a flexible display that is coupled to the first device housing 203 and the second device housing 204, spanning the hinge 205. Features can be incorporated into the device housing 202, including control devices, connectors, and so forth.

Also shown in FIG. 2 is an explanatory block diagram schematic 206 of the explanatory electronic device 200. In one or more embodiments, the block diagram schematic 206 is configured as a printed circuit board assembly disposed within the device housing 202 of the electronic device 200. Various components can be electrically coupled together by conductors or a bus disposed along one or more printed circuit boards.

The illustrative block diagram schematic 206 of FIG. 2 includes many different components. Embodiments of the disclosure contemplate that the number and arrangement of such components can change depending on the particular application. Accordingly, electronic devices configured in accordance with embodiments of the disclosure can include some components that are not shown in FIG. 2, and other components that are shown may not be needed and can therefore be omitted.

In one embodiment, the electronic device includes one or more processors 207. In one embodiment, the one or more processors 207 can include an application processor and, optionally, one or more auxiliary processors. One or both of the application processor or the auxiliary processor(s) can include one or more processors. One or both of the application processor or the auxiliary processor(s) can be a microprocessor, a group of processing components, one or more ASICs, programmable logic, or other type of processing device. The application processor and the auxiliary processor(s) can be operable with the various components of the block diagram schematic 206. Each of the application processor and the auxiliary processor(s) can be configured to process and execute executable software code to perform the various functions of the electronic device with which the block diagram schematic 206 operates. A storage device, such as memory 208, can optionally store the executable software code used by the one or more processors 207 during operation.

In this illustrative embodiment, the block diagram schematic 206 also includes a communication device 209 that can be configured for wired or wireless communication with one or more other devices or networks. The networks can include a wide area network, a local area network, and/or personal area network. The communication device 209 may also utilize wireless technology for communication, such as, but are not limited to, peer-to-peer or ad hoc communications such as HomeRF, Bluetooth and IEEE 802.11, and other forms of wireless communication such as infrared technology. The communication device 209 can include wireless communication circuitry, one of a receiver, a transmitter, or transceiver, and one or more antennas 210.

In one embodiment, the one or more processors 207 can be responsible for performing the primary functions of the electronic device with which the block diagram schematic 206 is operational. For example, in one embodiment the one or more processors 207 comprise one or more circuits operable with the display 201 to present presentation information to a user. The executable software code used by the one or more processors 207 can be configured as one or more modules 211 that are operable with the one or more processors 207. Such modules 211 can store instructions, control algorithms, and so forth.

In one or more embodiments, the block diagram schematic 206 includes an ultra-wideband component 212. In one or more embodiments, the ultra-wideband component is similar to the communication device 209 in that it is configured to perform wireless communications with one or more other ultra-wideband components that may be integrated into, or attached to, other devices. The illustrative ultra-wideband component of FIG. 2 is a dedicated ultra-wideband transceiver constructed into the electronic device 200 configured to use the one or more antennas 210 or its own antenna structure to communicate, using ultra-wideband technology, with another ultra-wideband component. In one or more embodiments, the ultra-wideband component comprises wireless communication circuitry, one of a receiver, a transmitter, or transceiver, and one or more antennas, which may be separate from, or the same as, the one or more antennas 210 used by the communication device 209.

The inclusion of an ultra-wideband component 212 advantageously allows wireless communication with another ultra-wideband component connected to or integrated into another electronic device that is fast and secure, all while requiring very little power. In one or more embodiments, the ultra-wideband component 212 consumes at least an order of magnitude less energy than does the communication device 209. Ultra-wideband communication is especially well suited to embodiments of the disclosure because it is configured for short-range (within 250 meters) communication, which is well beyond the typical distance that will occur when an electronic device such as the electronic device 200 of FIG. 2 is being used to control a content presentation companion device. Additionally, the accuracy of location, and therefore the accuracy of distance measurements, is within a centimeter or less. This is in contrast to Bluetooth.sup.™ which has an accuracy range of between one and five meters, and is far better than Wi-Fi, which has an accuracy of five to fifteen meters. Ultra-wideband is also quite reliable, in that it offers strong immunity to multi-path communication channels and interference in the line of sight. It also offers exceptional bandwidth, with data communications occurring at up to 27 Mbps, which is in contrast to the 2 Mbps provided by Bluetooth.sup.™. Ultra-wideband is also very low latency, with typically latencies being less than a millisecond, which is in contrast to the several seconds of latency that can occur with Bluetooth.sup.™.

In one or more embodiments, the ultra-wideband component 212 can also be used to measure angle of arrival. Effectively, when the one or more antennas 210 are configured as an antenna array, the ultra-wideband component 212 can compare signals received from one side of the antenna array with other signals received from another side of the antenna array to determine an orientation of the electronic device 200 in three-dimensional space 213 relative to a content presentation companion device having another ultra-wideband component attached thereto or integrated therein.

Thus, angle of arrival measures the phase difference between two receive antennas of an antenna array to determine the amount of relative angle offset between the antenna array and a source of the signals. If two devices are situated normal to each other, then the angle of arrival would be either zero or very small. Additionally, this angle of arrival is independent of distance. The angle of arrival measurement is capable of measuring where the electronic device 200 is in relation to another electronic device from which phase differentiated signals are received in terms of elevation and azimuth as well.

To illustrate the independence of distance, if the electronic device 200 is situated normal to another electronic device with an angle of arrival that is zero, this angle of arrival remains zero when the electronic device 200 moves toward, or away from, the other electronic device (without rotating and staying on the same trajectory). It should be noted that an angle of arrival measurement can also measure how parallel the plane of the electronic device 200 and the ultra-wideband antenna array of the other electronic device are arranged (when on bore sight for the two antennas). Again, a zero angle of arrival would mean the two antenna arrays are perfectly parallel and perpendicular to each other. Again, in most situations angle of arrival is relatively independent of distance.

Various sensors 214 can be operable with the one or more processors 207. One example of a sensor that can be included with the various sensors 214 is a touch sensor. The touch sensor can include a capacitive touch sensor, an infrared touch sensor, resistive touch sensors, or another touch-sensitive technology. Capacitive touch-sensitive devices include a plurality of capacitive sensors, e.g., electrodes, which are disposed along a substrate. Each capacitive sensor is configured, in conjunction with associated control circuitry, e.g., the one or more processors 207, to detect an object in close proximity with—or touching—the surface of the display 201 or the device housing 202 of the electronic device 200 by establishing electric field lines between pairs of capacitive sensors and then detecting perturbations of those field lines.

Another example of a sensor that can be included with the various sensors 214 is a geo-locator that serves as a location detector 215. In one embodiment, location detector 215 is able to determine location data. Location can be determined by capturing the location data from a constellation of one or more earth orbiting satellites, or from a network of terrestrial base stations to determine an approximate location. The location detector 215 may also be able to determine location by locating or triangulating terrestrial base stations of a traditional cellular network, or from other local area networks, such as Wi-Fi networks.

Another example of a sensor that can be included with the various sensors 214 is an orientation detector 216 operable to determine an orientation and/or movement of the electronic device 200 in three-dimensional space 213. Illustrating by example, the orientation detector 216 can include an accelerometer, gyroscopes, or other device to detect device orientation and/or motion of the electronic device 200. Using an accelerometer as an example, an accelerometer can be included to detect motion of the electronic device. Additionally, the accelerometer can be used to sense some of the gestures of the user, such as one talking with their hands, running, or walking.

The orientation detector 216 can determine the spatial orientation of an electronic device 200 in three-dimensional space 213 by, for example, detecting a gravitational direction. In addition to, or instead of, an accelerometer, an electronic compass can be included to detect the spatial orientation of the electronic device 200 relative to the earth's magnetic field. Similarly, one or more gyroscopes can be included to detect rotational orientation of the electronic device 200.

Other components 217 operable with the one or more processors 207 can include output components such as video, audio, and/or mechanical outputs. For example, the output components may include a video output component or auxiliary devices including a cathode ray tube, liquid crystal display, plasma display, incandescent light, fluorescent light, front or rear projection display, and light emitting diode indicator. Other examples of output components include audio output components such as a loudspeaker disposed behind a speaker port or other alarms and/or buzzers and/or a mechanical output component such as vibrating or motion-based mechanisms.

The other components 217 can also include proximity sensors. The proximity sensors fall in to one of two camps: active proximity sensors and "passive" proximity sensors. Either the proximity detector components or the proximity sensor components can be generally used for gesture control and other user interface protocols.

The other components 217 can optionally include a barometer operable to sense changes in air pressure due to elevation changes or differing pressures of the electronic device 200. The other components 217 can also optionally include a light sensor that detects changes in optical intensity, color, light, or shadow in the environment of an electronic device. This can be used to make inferences about context such as weather or colors, walls, fields, and so forth, or other cues. An infrared sensor can be used in conjunction with, or in place of, the light sensor. The infrared sensor can be configured to detect thermal emissions from an environment about the electronic device 200. Similarly, a temperature sensor can be configured to monitor temperature about an electronic device.

A context engine 218 can then be operable with the various sensors to detect, infer, capture, and otherwise determine persons and actions that are occurring in an environment about the electronic device 200. For example, where included one embodiment of the context engine 218 determines assessed contexts and frameworks using adjustable algorithms of context assessment employing information, data, and events. These assessments may be learned through repetitive data analysis. Alternatively, a user may employ a menu or user controls via the display 201 to enter various parameters, constructs, rules, and/or paradigms that instruct or otherwise guide the context engine 218 in detecting multi-modal social cues, emotional states, moods, and other contextual information. The context engine 218 can comprise an artificial neural network or other similar technology in one or more embodiments.

In one or more embodiments, the context engine 218 is operable with the one or more processors 207. In some embodiments, the one or more processors 207 can control the context engine 218. In other embodiments, the context engine 218 can operate independently, delivering information gleaned from detecting multi-modal social cues, emotional states, moods, and other contextual information to the one or more processors 207. The context engine 218 can receive data from the various sensors 214. In one or more embodiments, the one or more processors 207 are configured to perform the operations of the context engine 218.

In one or more embodiments, the electronic device 200 includes a distance determination manager 219 that is operable with the ultra-wideband component 212 to determine a precise distance (within one centimeter) of the electronic device 200 in relation to other electronic devices also having ultra-wideband components or ultra-wideband tags (the difference between a ultra-wideband component and a ultra-wideband tag is that the ultra-wideband component is integrated into an electronic device as an original component, while a ultra-wideband tag is a self-contained ultra-wideband component that can be attached to an electronic device as a retrofit item to configure a legacy electronic device to communicate via ultra-wideband technology).

A motion detector 220 determines when the electronic device 200 moves. As will be described in more detail below, in one or more embodiments the one or more processors 207 of the electronic device 200 dynamically enhance a user interface of the content presentation companion device as a function of the distance (determined by the distance determination manager 219) between the electronic device 200 and the content presentation companion device. While ultra-wideband communication is very conservative with respect to power consumption, embodiments of the disclosure contemplate that the electronic device 200 can be even more efficient when adjustments to the user interface enhancement only occur when the distance between the electronic device 200 and the content presentation companion device has changed. Accordingly, in one or more embodiments the user interface enhancement is altered or adjusted in response to one or both of the distance determination manager 219 detecting a change in the distance between the electronic device 200 and the content presentation companion device and/or the motion detector 220 determining that the electronic device 200 has moved relative to the content presentation companion device after a user interface enhancement has been made as a function of the distance between the content presentation companion device and the electronic device 200. To that end, a power manager 221 can be configured to ensure that distance measurements, ultra-wideband communications, user interface enhancements, and other operations are only performed once the electronic device 200 has moved since the last similar operation was performed.

A content presentation companion device integration manager 222 is operable to perform content redirection operations. In one or more embodiments, the content presentation companion device integration manager 222 allows the one or more processors 207 of the electronic device 200 to connect to a content presentation companion device such as a larger monitor, television, or other device having a larger screen. The content presentation companion device integration manager 222 then facilitates wireless streaming of content to the larger display of a content presentation companion device. In one or more embodiments, neither a cable nor a docking station is required for the content presentation companion device integration manager 222 to redirect content to another device. Instead, the content presentation companion device integration manager 222 employs the communication device 209 and the one or more antennas 210 to transmit content to a content presentation companion device.

The inclusion of the content presentation companion device integration manager 222 allows the electronic device 200 to be used as a mouse, trackpad, or other control device while content is being presented on the content presentation companion device. The content presentation companion device integration manager 222 can be used for presenting pictures, videos, television shows, or movies on the larger display of a content presentation companion device. Additionally, the content presentation companion device integration manager 222 can facilitate gaming, video conferences, and other content presentation tasks using the display of a content presentation companion device as well.

In one or more embodiments, the content presentation companion device integration manager 222 dynamically enhances one or both of a user interface and/or an audio performance characteristic of a content presentation companion device as a function of a distance between the electronic device 200 and the content presentation companion device. For instance, in one or more embodiments the content presentation companion device integration manager 222 can adjust a user interface feature being presented on a content presentation companion device as a function of the distance (determined by the distance determination manager 219). In other embodiments, the content presentation companion device integration manager 222 can cause a magnification tool to be presented for enhancing the user interface as a function of the distance. In still other embodiments, the content presentation companion device integration manager 222 can adjust an audio performance characteristic of the content presentation companion device as a function of the distance. Other user interface enhancements will be described below. Still others will be obvious to those of ordinary skill in the art having the benefit of this disclosure.

In one or more embodiments, the content presentation companion device integration manager 222 enhances user interface and audio performance characteristics when the distance determination manager 219 determines a nearly exact distance between the electronic device 200 controlling a content presentation companion device and the content presentation companion device itself based upon signals received from the ultra-wideband component 212. In one or more embodiments, the ultra-wideband component 212, using ultra-wideband ranging processes to communicate with another ultra-wideband component, delivers signals to the distance determination manager 219, which determines a distance between an electronic device 200 carrying the ultra-wideband component 212 and a content presentation companion device having its own an ultra-wideband component. When the one or more processors 207 of the electronic device 200 determine that an electronic device 200 is in communication with a content presentation companion device using the content presentation companion device integration manager 222, the distance determination manager 219 determines the distance between the content presentation companion device and the electronic device 200 using the signals from the ultra-wideband component 212. From this distance measurement, the content presentation companion device integration manager 222 can adjust and enhance elements such as mouse pointer size, mouse pointer speed, display resolution, display font size, and audio lag adjustments can be made.

Thereafter, in one or more embodiments motion detectors 220 carried by the electronic device 200 can determine when the electronic device 200 moves relative to the content presentation companion device. When this occurs, the context engine 218, functioning as a distance determination manager, can repeat the distance determination, with the content presentation companion device integration manager 222 thereafter again performing the user interface adjustment. Embodiments of the disclosure advantageously enhance the user interface of a content presentation companion device dynamically based upon determining the exact distance between an electronic device 200 and the content presentation companion device itself.

In one or more embodiments, the ultra-wideband component 212 can also perform an ultra-wideband angle of arrival measurement to determine an orientation of the electronic device 200 in three-dimensional space 213 relative to the content presentation companion device. Illustrating by example, the ultra-wideband angle of arrival measurement can be used to determine whether a person holding an electronic device 200, while controlling a content presentation companion device, is facing the content presentation companion device or is facing away from the content presentation companion device. In one or more embodiments, the content presentation companion device integration manager 222 can cause the content presentation companion device to enter an editing mode or a pointer mode when the electronic device 200 is oriented toward the content presentation companion device, while causing the content presentation companion device to enter a presentation mode when the electronic device 200 is oriented away from the content presentation companion device.

Figure 3:
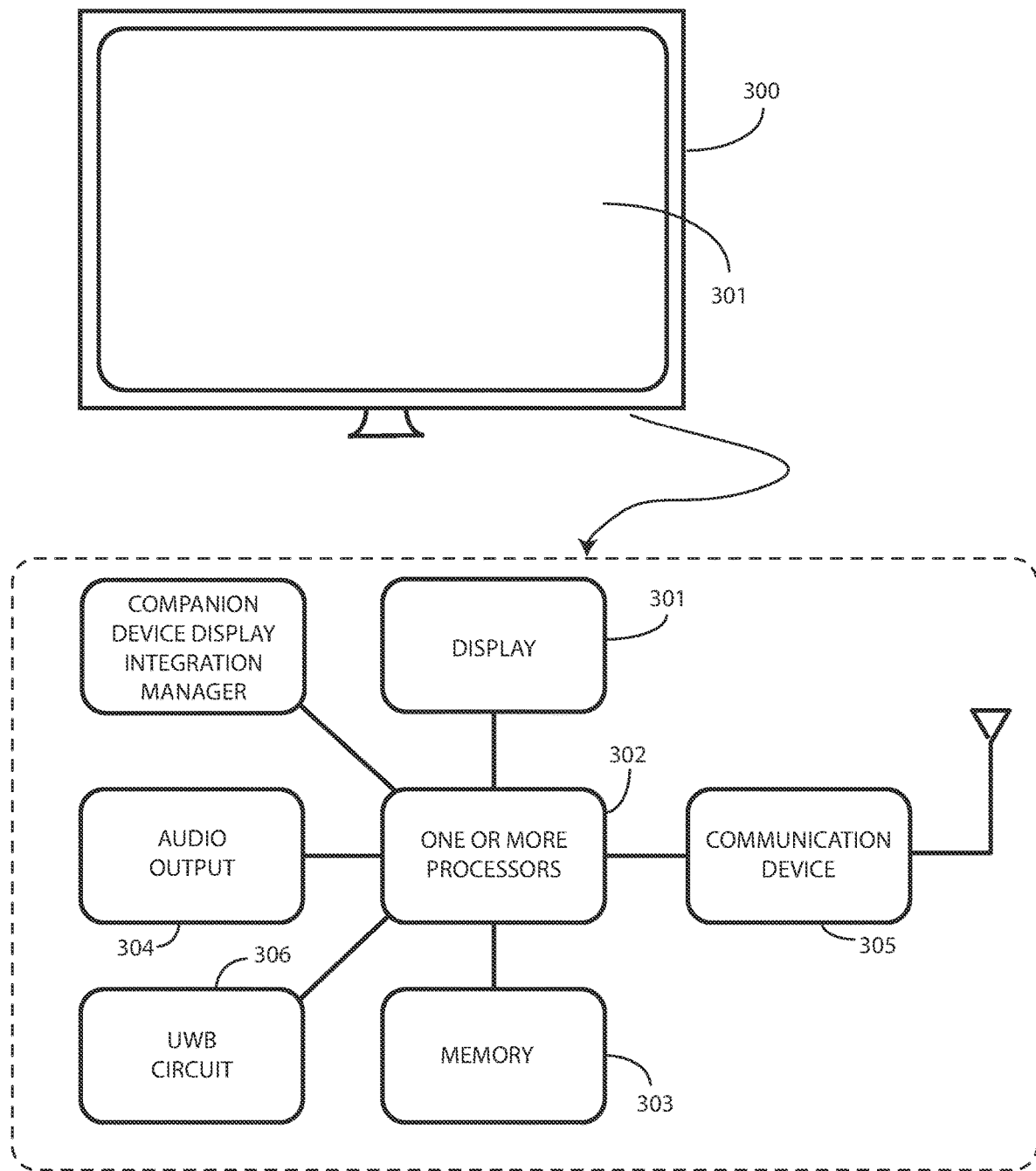
FIG. 3 illustrates one explanatory content presentation companion device in accordance with one or more embodiments of the disclosure.

Turning now to FIG. 3, illustrated therein is one explanatory content presentation companion device 300 in accordance with one or more embodiments of the disclosure. In this illustrative embodiment, the content presentation companion device 300 comprises a color video monitor. In other embodiments, the content presentation companion device 300 can take other forms. Illustrating by example, the content presentation companion device 300 can be a television, a computer display, a laptop display, a tablet computer, or a projector projecting content onto a screen. Other examples of content presentation companion devices 300 will be obvious to those of ordinary skill in the art having the benefit of this disclosure. Regardless of configuration, in one or more embodiments the content presentation companion device 300 includes one or more processors 302, a display 301, a memory 303, an audio output 304, and a communication device 305 capable of wired or wireless communication with an electronic device such as the electronic device (200) of FIG. 2.

In one or more embodiments, when coupled by a wireless connection to such an electronic device (200), the content presentation companion device 300 can function as a primary display for the electronic device (200). The electronic device (200) can receive content from a terrestrial broadcast network, cable television network, Internet streaming service, or combinations thereof, and redirect this content to the content presentation companion device 300 (using its content presentation companion device integration manager (222)) since its display 301 is larger than the display (201) of the electronic device (200). This allows people within the environment of the electronic device (200) or content presentation companion device 300 to more easily see the content. In one or more embodiments, content flows from the electronic device (200) to the content presentation companion device 300 through the communication device 305.

In one or more embodiments, the content presentation companion device 300 includes an ultra-wideband component 306 that can communicate with the ultra-wideband component of another electronic device. In one or more embodiments, the ultra-wideband component 306 is an ultra-wideband communication device that is integrated into the content presentation companion device 300. In other embodiments, the ultra-wideband component 306 is configured as a "tag" that includes one of a transmitter and receiver or transceiver and one or more antennas. When communicating with another ultra-wideband component, the ultra-wideband component 306 can be either a responder or an initiator of communication. In one or more embodiments, the ultra-wideband component 306 of the content presentation companion device 300 is capable of functioning in a similar manner to the ultra-wideband component (212) of the electronic device (200) of FIG. 2.

It is to be understood that in both FIG. 2 and FIG. 3, the elements illustrated are provided for illustrative purposes only in accordance with embodiments of the disclosure. Neither is intended to be a complete schematic diagram of the various components required. Therefore, other electronic devices in accordance with embodiments of the disclosure may include various other components obvious to those of ordinary skill in the art having the benefit of this disclosure, but not shown in FIG. 2 or FIG. 3, or may include a combination of two or more components or a division of a particular component into two or more separate components, and still be within the scope of the present disclosure.

As will be described in more detail below with reference to the subsequent methods and method steps, the enhancement of user interface features of a content presentation companion device, be they visual user interface features such as a font, a window size, a pointer size of a pointer, a speed of movement of the pointer, a user interaction element, a plurality of user actuation targets, or the presentation of a magnifier, or audio user interface features such as a volume level or audio latency amount, in one or more embodiments these adjustments occur as a function of a distance between the electronic device 200 and the content presentation companion device 300, optionally in combination with an angle of arrival measurement. Other examples of user interface features suitable for such enhancements will be described below. Still others will be obvious to those of ordinary skill in the art having the benefit of this disclosure.

Figure 4:
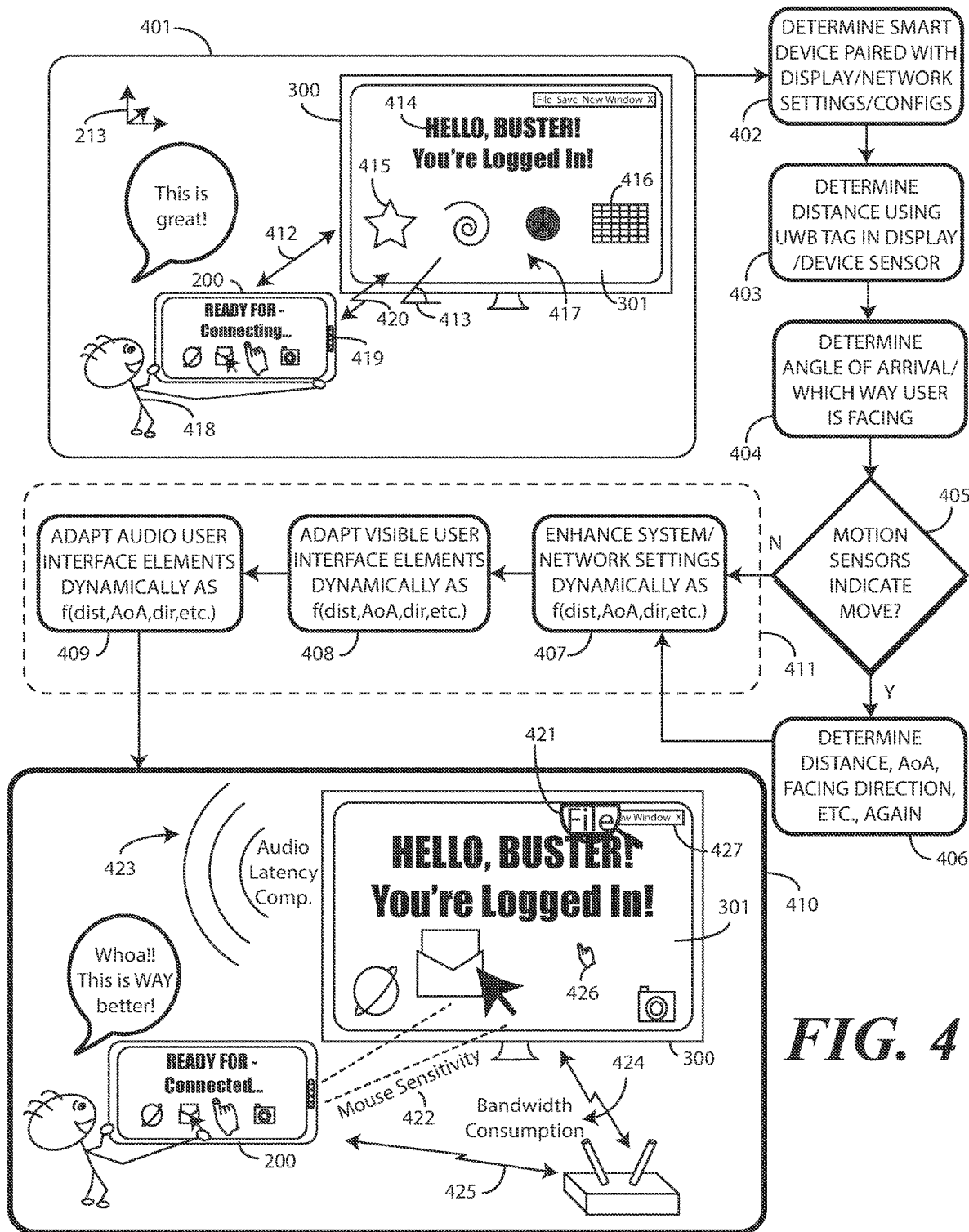
FIG. 4 illustrates one or more explanatory method steps in accordance with one or more embodiments of the disclosure.

Turning now to FIG. 4, illustrated therein one or more explanatory method steps illustrating how the electronic device 200 of FIG. 2 and the content presentation companion device 300 can be used as a system. Beginning at step 401, the electronic device 200 is electronically in communication with the content presentation companion device. When the electronic device 200 is electronically in communication with the content presentation companion device 300, this allows the content presentation companion device integration manager (222) of the electronic device 200 to exploit the larger display 301 of the content presentation companion device 300 to present content. Illustrating by example, in one or more embodiments the electronic device 200 can operate in a "desktop" mode by presenting a traditional computer user interface on the display 301 of the content presentation companion device 300. Alternatively, the electronic device 200 may present content such as videos, images, or other multimedia content on the display 301 of the content presentation companion device 300.

Embodiments of the disclosure contemplate that with the advanced computing power available in smartphones and other electronic devices, users often consume movies, videos, television shows, and other content using these devices. Additionally, they can perform work operations such as sending email, managing files, working on documents and spreadsheets, and so forth. By establishing an electronic communication channel between the electronic device 200 and the content presentation companion device 300, the processing power of the electronic device 200 can be leveraged to present content on the display 301 of the content presentation companion device 300. This allows a user to watch television, play video games, work on homework or office work, video call friends and family, or perform other tasks using the one or more processors (207) and the content presentation companion device integration manager (222) of the electronic device 200 combined with the large display 301 of the content presentation companion device 300. In one or more embodiments, the content presentation companion device In one or more embodiments, one or more processors (207) of the electronic device 200 first determine that the electronic device 200 is electronically in communication with the content presentation companion device 300 at step 402. This determination can optionally include determining that the content presentation companion device integration manager (222) is using the display 301 of the content presentation companion device 300 as a primary display for the electronic device 200. In one or more embodiments, the one or more processors (207) of the electronic device 200 use the communication device (209) of the electronic device 200 to detect that the electronic device 200 is electronically in communication with the content presentation companion device 300 at step 402.

At step 403, the one or more processors (207) of the electronic device 200 determine, using the ultra-wideband component (212) and distance determination manager (219), each of which can be components of the one or more processors (207) a distance 412 between the electronic device 200 and the content presentation companion device 300 using a ultra-wideband ranging process facilitated by communication of the ultra-wideband component (212) of the electronic device 200 and the ultra-wideband component (306) of the content presentation companion device 300.

At optional step 404, the one or more processors (207) of the electronic device 200 determine, again using the ultra-wideband component (212) and an ultra-wideband ranging process, an angle of arrival 413 between the electronic device 200 and the content presentation companion device 300. As noted above, in one or more embodiments the ultra-wideband component (212) of the electronic device can be used to determine this angle of arrival 413, which represents an orientation of the electronic device 200 in three-dimensional space 213 relative to the orientation of the content presentation companion device 300 in the same three-dimensional space 213.

In one or more embodiments, step 404 comprises the ultra-wideband component (212) comparing signals received by one portion of an antenna array operable with the ultra-wideband component (212) with other signals received by another portion of the antenna array. This comparison can then be used to determine an orientation of the electronic device 200 in three-dimensional space 213 relative to the orientation of the content presentation companion device 300 in the three-dimensional space 213.

At decision 405, the motion detector (220) and/or distance determination manager (219) of the electronic device 200 determines if the electronic device 200 moves relative to the content presentation companion device. In one or more embodiments, decision 405 comprises determining, with a motion detector (220) determining whether motion of the electronic device 200 occurs changing the distance 412 between the electronic device 200 and the content presentation companion device 300. Where it does, steps 403 and 404 are repeated again at step 406. Illustrating by example, step 406 can comprise using the ultra-wideband component (212) of the electronic device 200 to repeatedly determine the distance 412 between the electronic device 200 and the content presentation companion device 300 using the ultra-wideband ranging process. In one or more embodiments, this repeating occurring at step 406 occurs with a frequency determined as a function of whether the distance is changing. When the distance is changing, the frequency is higher. When the distance is constant, or where changes in distance are small and within a predefined threshold such that the electronic device 200 can be considered to be stationary, step 406 is not performed, thereby saving power within the electronic device 200. Instead, the method proceeds to step set 411.

In step set 411, one or more user enhancement features of the content presentation companion device 300 can be adjusted as a function of the distance 412 between the electronic device 200 and the content presentation companion device determined at step 403 and, optionally, the angle of arrival 413 determined at step 404. The sub-steps of step set 411, e.g., steps 407,408,409 can be performed in any combination. Illustrating by example, step 407 could be performed alone or in combination with either or both of step 408 and step 409. The same is true with steps 408 and 409.

At step 407, one or more processors (207) of the electronic device 200, optionally in conjunction with the content presentation companion device integration manager (222), dynamically enhance a user interface of the content presentation companion device 300 as a function of the distance 412 between the electronic device 200 and the content presentation companion device in one or more embodiments. In one embodiment, this comprises adjusting a user interface feature being presented on the display 301 of the content presentation companion device 300.

In one or more embodiments, this user interface feature is a static user interface feature. Illustrating by example, in one or more embodiments the static user interface feature enhanced at step 407 comprises a font 414 being presented on the display 301 of the content presentation companion device 300. In another embodiment, the static user interface feature enhanced at step 407 comprises a display resolution 415 of one or more images being presented on the display 301 of the content presentation companion device 300. In still another embodiment, the static user interface feature enhanced at step 407 comprises a window size 416 of a window being presented on the display 301 of the content presentation companion device 300. A combination of these enhancements can occur at step 407 as well.

In other embodiments, the user interface feature enhanced at step 407 comprises a dynamic user interface feature. Illustrating by example, in one or more embodiments the dynamic user interface feature enhanced at step 407 comprises a pointer size 417 of a pointer being presented on the display 301 of the content presentation companion device 300.

Where the angle of arrival 413 measurement is included with distance, the dynamic user interface feature can take other forms. For instance, in one or more embodiments step 407 comprises adjusting the mode of operation of the content presentation companion device 300 as a function of the ultra-wideband angle of arrival 413 measurement.

In one or more embodiments, the angle of arrival 413 measurement determines whether a person 418 holding the electronic device 200 is facing the content presentation companion device 300 or is facing away from the content presentation companion device 300 by determining an angle of orientation of a major face 419 of the electronic device 200 relative to a major face of the content presentation companion device 300, one example of which in the display 301. In one or more embodiments, step 407 comprises enhancing the user interface of the content presentation companion device 300 by causing the content presentation companion device 300 to enter an edit or pointer mode when the person 418 or major face 419 is facing the content presentation companion device 300. By contrast, step 407 can comprise enhancing the user interface of the content presentation companion device 300 by causing the content presentation companion device 300 to enter a presentation mode when the person 418 or major face 419 is facing away from the content presentation companion device 300.

In one or more embodiments, step 407 comprises, in response to an antenna array carried by the electronic device 200 and determining an angle of arrival defined between signals delivered by the communication device (209) to the content presentation companion device 300 and a major face of the content presentation companion device 300, causing the communication device (209) to transmit user interface adjustment signals cause the content presentation companion device 300 to transition to a presentation mode when the angle of arrival 413 is greater than ninety degrees. By contrast, step 407 can comprise causing the communication device (209) to transmit user interface adjustment signals causing the content presentation companion device 300 to enter an editor mode of operation when the angle of arrival 413 is less than ninety degrees.

In one or more embodiments, the angle of arrival 413 can be used to adjust the speed of movement of the pointer as well. Embodiments of the disclosure contemplate that when the electronic device 200 is closer to the content presentation companion device 300, with the electronic device 200 controlling a pointer being presented on the display 301 of the content presentation companion device 300, motion detected by the motion detector (220) of the electronic device 200 should correspond to larger movements of the pointer than when the electronic device 200 is situated farther from the content presentation companion device 300. Accordingly, in one or more embodiments step 407 comprises, in response to detecting an amount of motion of the electronic device 200 in three-dimensional space 213, adjusting, with the one or more processors (207), a speed of movement of the pointer as a combined function of the distance 412 and the amount of motion of the electronic device 200 in the three-dimensional space 213.

Angle of arrival 413 can be used to adjust pointer motion as well. Illustrating by example, when an antenna array operable with the ultra-wideband component (212) of the electronic device determines the angle of arrival 413 at which signals delivered by the communication device (209) to the content presentation companion device 300 intersect a major face of the content presentation companion device 300 such as the major face where the display 301 is situated, step 407 can comprise adjusting an amount of movement of the pointer along the display of the content presentation companion device relative to the amount of motion of the electronic device 200 in the three-dimensional space 213 as a function of the angle of arrival 413. Accordingly, when the electronic device 200 is directly facing the content presentation companion device 300 movements of the pointer will be greater for a predefined motion of the electronic device 200 in three-dimensional space 213 than they will be when the electronic device 200 is oriented off-center from the content presentation companion device 300 as shown in FIG. 4.

As noted above, the motion detector (220) of the electronic device 200 can also cause distance and angle of arrival measurements of steps 403 and 404 to be repeated at step 406. Accordingly, if the person 418 moves the electronic device 200 closer to the content presentation companion device 300 or farther from the content presentation companion device 300, the method of FIG. 4 will re-adjust any user interface feature enhancements made at step 407.

Illustrating by example, when the motion detector (220) of the electronic device 200 detects movement of the electronic device 200 away from the content presentation companion device 300 by a predefined distance, motion of the electronic device 200 in the three-dimensional space 213 will cause visible objects presented on the display 301 of the content presentation companion device to change in different ways. Accordingly, when step 406 is performed, step 407 can comprise, in response to detecting the movement of the electronic device 200 away from the content presentation companion device 300 and another amount of motion of the electronic device 200 in the three-dimensional space 213, again adjusting the speed of movement of the pointer as a combined function of the distance, the other distance and the other amount of motion. Step 407 can also comprise again adjusting the amount of movement of the pointer along the content presentation companion device relative to the other amount of motion of the electronic device in the three-dimensional space.

Speaking more generally, when the ultra-wideband component (212) of the electronic device 200 determines that the distance between the electronic device 200 and the content presentation companion device 300 has changed, step 407 can comprise dynamically enhancing the user interface of the content presentation companion device 300 as another function of the newly detected distance between the electronic device 200 and the content presentation companion device 300. Step 407 can further include again adjusting the user interface feature being presented on the content presentation companion device.

Effectively, when step 402 determines that the communication device (209) of the electronic device 200 is electronically communicating with the content presentation companion device 300 while the content presentation companion device 300 is operating as a primary display for the electronic device 200, and when a distance 412 between the electronic device 200 and the content presentation companion device is determined at step 403 via an ultra-wideband component (212) of the electronic device 200 electronically communicating with another ultra-wideband component (306) operating in the content presentation companion device 300, step 407 can comprise causing the communication device (209) of the electronic device 200 to transmit user interface adjustment signals 420 to the content presentation companion device 300 that dynamically modify a user interface feature being presented on the primary display as a function of the distance 412. When step 406 is included, i.e., when a motion detector (220) of the electronic device 200 causes the one or more processors (207) of the electronic device 200 to determine another distance between the electronic device 200 and the content presentation companion device 300 by processing other ultra-wideband ranging signals received by the ultra-wideband component (212) when the motion detector (220) detects movement of the electronic device 200 away from the content presentation companion device 300, step 407 can comprise causing the communication device (209) to transmit other user interface adjustment signals to the content presentation companion device 300 that dynamically again modify the user interface feature being presented on the primary display as a function of the newly detected distance.

Step 408 is similar to step 407 in that a visible user interface component being presented on the display 301 of the content presentation companion device 300 is again adjusted. However, rather than adjusting an element already being presented, step 408 enhances the user interface of the content presentation companion device 300 by magnifying one or more user interface elements being presented on the display 301 of the content presentation companion device 300.

Illustrating by example, as shown at step 410, in one or more embodiments the enhancement occurring at step 408 comprises the presentation of a virtual magnifying glass 421 atop content being presented on the display 301 of the content presentation companion device 300 to cause magnification of one or more user interface elements being presented. These user interface elements can comprise a user actuation target 426, a plurality of user actuation targets, user actuation targets situated within a window 427 being presented on the display 301 of the content presentation companion device 300, or other objects. In one or more embodiments, magnification occurs only within the perimeter of the virtual magnifying glass 421.

In one or more embodiments, the amount of magnification provided on the display 301 of the content presentation companion device occurs as a function of the distance 412, with larger distances corresponding to greater magnification and shorter distances corresponding to less magnification. Illustrating by example, the size of the virtual magnifying glass 421 can be larger when the distance 412 is greater and smaller when the distance 412 is less, and so forth. Accordingly, as with the amount of magnification, the size of the virtual magnifying glass 421 can be determined as a function of the distance 412 as well.

Motion detected by the motion detector (220) of the electronic device 200 can cause the virtual magnifying glass 421 to move. The speed of motion can change as was the case with the pointer described above with reference to step 407. In one or more embodiments, one or more processors (207) of the electronic device can adjust a speed of movement of the virtual magnifying glass 421 as a combined function of the distance 412 and a detected amount of motion of the electronic device 200 in three-dimensional space 213.

Changes in motion and/or magnification can also be affected by the angle of arrival 413. In one or more embodiments, when the ultra-wideband component (212) of the electronic device 200 determines the angle of arrival 413 at which signals delivered by the communication device (209) intersect a major face of the content presentation companion device 300, step 408 can comprise adjusting an amount of movement of the virtual magnifying glass 421 along the display 301 of the content presentation companion device 300 relative to the amount of motion of the electronic device 200 in three-dimensional space 213 as a function of the angle of arrival 413. These "amount of motion" adjustments, be they in relation to a pointer, the virtual magnifying glass 421, or other user interface elements being presented on the display 301 of the content presentation companion device 300, are illustrated graphically in FIG. 4 at step 410 as mouse sensitivity 422.

At step 409, audio performance characteristics 423 of the content presentation companion device 300 can be adjusted as a function of one or more of the distance 412 determined at step 403, the angle of arrival 413 determined at step 404, and/or the motion of the electronic device 200 in the three-dimensional space 213. Illustrating by example, in one or more embodiments step 409 comprises enhancing a volume level of audio output emanating from the content presentation companion device 300 as a function of the distance 412, with the audio output getting louder when the electronic device 200 is farther from the content presentation companion device 300 and softer when the electronic device 200 is closer to the content presentation companion device 300. The audio performance characteristic 423 being adjusted at step 409 can also include an audio latency amount. The audio performance characteristic 423 being adjusted at step 409 can also include the balance of an audio signal emanating from the content presentation companion device 300. Other examples of audio performance characteristics 423 that can be adjusted at step 409 will be obvious to those of ordinary skill in the art having the benefit of this disclosure.

Where step 406 is included, the dynamic adjustments of the audio performance characteristic 423 can be repeated at step 409, as was the case with steps 407 and 408. For instance, when the motion detector (220) carried by the electronic device 200 determines that the electronic device 200 is moving or has moved in the three-dimensional space 213, the distance can be again determined at step 406. Thereafter, step 409 can comprise dynamically enhancing the audio performance characteristic 423 of the content presentation companion device 300 again as a function of the newly measured distance.

The audio performance characteristic 423 enhancement of step 409 can take other forms as well. In one or more embodiments, the one or more processors (207) of the electronic device 200 can further determine, from signals received by the communication device (209), an amount of loading 424 borne by a network 425 facilitating communication between the communication device (209) and the content presentation companion device 300. As heavier loading may be associated with greater latency, in one or more embodiments step 409 comprises dynamically enhancing of the audio performance characteristic 423 further as a function of the loading 424.

Similarly, angle of arrival 413 can be used to adjust the audio performance characteristic 423. In one or more embodiments, when step 404 comprises determining, with an antenna array carried by the electronic device 200, the angle of arrival 413 at which signals delivered by the communication device (209) to the content presentation companion device 300 intersect a major face of the content presentation companion device 300, step 409 can comprise dynamically enhancing of the audio performance characteristic 423 further as a function of the angle of arrival 413.

Some of the results of step set 411 are shown at step 410. By comparing step 401 to step 410, these results can be seen. As shown, the pointer has become magnified, with its motion occurring as a combined function of the distance 412 and the angle of arrival 413. The user actuation target to which the pointer is pointing has become magnified. Other user actuation targets, such as the hand to the right of the pointer, have become demagnified. A virtual magnifying glass 421 has been placed on the display 301. The application set has changed. The font 414 and resolution 415 have changed as a function of the distance 412. The audio latency has been adjusted as a function of distance 412, angle of arrival 413, and loading 424 of the network 425.

In sum, step 410 provides an improved, automatic, dynamic, and intuitive user interface enhancement that, when an electronic device 200 is connected to a content presentation companion device 300 with a distance 412 between the electronic device 200 and the content presentation companion device 300 being determined, enhances the user interface dynamically based on determining the exact distance between the content presentation companion device 300 and the electronic device 200. These enhancements can include adapting the following elements based upon the distance 412: a mouse pointer size, a mouse pointer speed, a display resolution, a display font size, and audio lag.

When angle of arrival 413 is included, combinations of ultra-wideband ranging, angle of arrival measurement, and motion of the electronic device 200 in three-dimensional space 213 (optionally using an accelerometer or gyroscope for detection) can be used to make the mouse pointer move even more smoothly on the display 301 of the content presentation companion device. What's more, motion of the electronic device 200 itself can be determined from signals from the motion detector (220) to control user interface elements presented on the display 301 of the content presentation companion device 300. For example, an accelerometer and/or gyroscope can determine motion of the electronic device 200 in three-dimensional space 213 to control the user interface elements presented on the display 301 of the content presentation companion device 300. These measurements, alone or in combination, can be used to adjust mouse sensitivity 422 due to the fact that the display 301 begins to take up a smaller cone of motion defined between the electronic device 200 and the content presentation companion device 300 at greater distances. Accordingly, a smaller movement of the electronic device 200 results in the mouse pointer moving across a larger portion of the display 301.

Detecting changes in the distance 412, the angle of arrival 413, the loading 424 of the network 425, or combinations thereof can cause steps 402 and 403 to repeat at step 406. Advantageously, this means that steps 402 and 403 are not continually occurring, thereby conserving power in the electronic device. This limited "re-measurement" feature also works well during a presentation due to the fact that the measurement sensors can be powered OFF or put in a low-power or sleep mode after an initial range determination is made.

Now that one general embodiment has been described with reference to FIG. 4, where one or more user enhancement features of the content presentation companion device 300 can be adjusted as a function of one or more combinations of the distance 412 between the electronic device 200 and the content presentation companion device determined at step 403 and, optionally, the angle of arrival 413 determined at step 404, attention will turn to some more specific examples that illustrate adjustments and results of step set 411. For simplicity of discussion, rather than illustrating the individual sub-steps of step set 411, e.g., steps 407,408,409, step set 411 will be shown generally since steps 407,408,409 can be performed in any combination. It is expected that one of ordinary skill, notwithstanding possibly significant effort and many design choices motivated by, for example, available time, current technology, and economic considerations, when guided by the embodiments illustrated in FIG. 4 and in FIGS. 5-9 will readily be able to identify the requisite sub-steps occurring in step set 411 with minimal experimentation.

Figure 5:
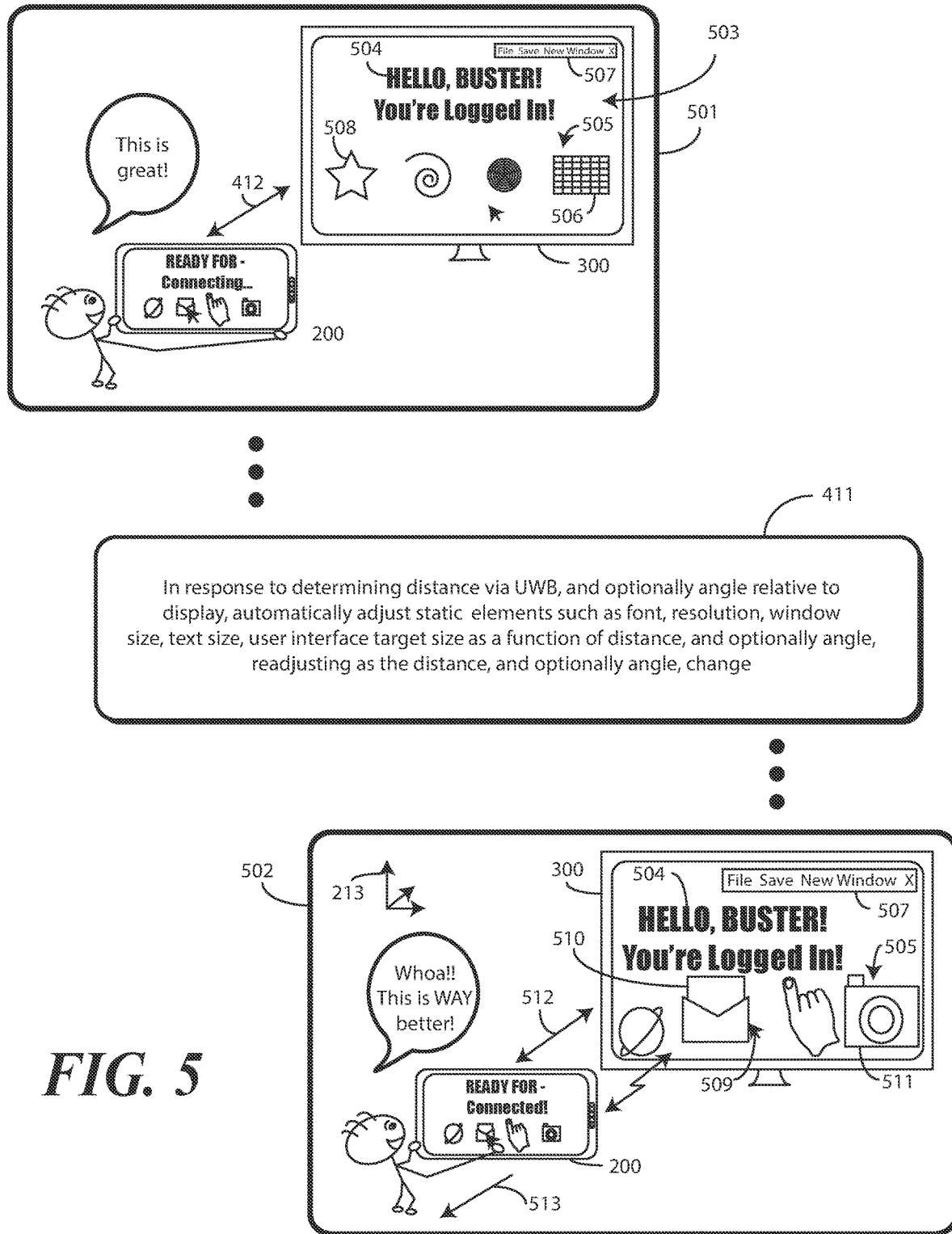
FIG. 5 illustrates one or more explanatory method steps in accordance with one or more embodiments of the disclosure.

Turning now to FIG. 5, illustrated therein are one or more method steps for dynamically enhancing a user interface feature being presented on a content presentation companion device 300 in accordance with one or more embodiments of the disclosure.

Beginning at step 501, illustrated therein is a system that includes an electronic device 200 comprising an ultra-wideband component (212), a communication device (209), and one or more processors (207). At step 501, a content presentation companion device 300 is electronically in communication with the electronic device 200. The content presentation companion device 300 includes another ultra-wideband component (306).

At step 501, the one or more processors (207) of the electronic device 200 identify a distance 412 between the electronic device 200 and the content presentation companion device 300 by processing signals from the ultra-wideband component (212). At step set 411, the one or more processors (207) of the electronic device 200 cause the communication device (209) to adjust a presentation characteristic of content 503 being presented at the content presentation companion device 300 as a function of the distance 412.

In this illustrative embodiment, at step set 411 the one or more processors (207) of the electronic device 200 cause the communication device (209) to adjust static user interface features of the content 503. Examples of static user interface features include a font 504 being presented on the content presentation companion device 300, a resolution 505 of one or more images 506 being presented on the content presentation companion device 300, the size of a window 507 being presented on the content presentation companion device 300, and the size of a user interface actuation target 508 being presented on the content presentation companion device 300. Other examples of static user interface features will be obvious to those of ordinary skill in the art having the benefit of this disclosure.

In one or more embodiments, the adjustment occurring at step set 411 dynamically enhances the user interface being presented at the content presentation companion device 300. This can occur in several ways. Illustrating by example, as shown in step 502, in one or more embodiments the dynamic enhancement results in the font 504 being presented on the content presentation companion device 300 getting larger. Similarly, this can result in one or more windows 507 being presented on the content presentation companion device 300 getting larger as well.

In one or more embodiments, the resolution 505 of one or more images 511 being presented on the content presentation companion device 300 can increase as well, as can the user interaction actuation targets 510. These changes can occur alone or in combination. Illustrating by example, in one or more embodiments all of these changes can occur simultaneously as a function of the distance 512. Thus, as the electronic device 200 gets farther away from the content presentation companion device 300, the font 504, the resolution, 505, the user interface actuation targets 510, and the window 507 can all get larger. In other embodiments, only the item near a pointer 509 gets larger as a function of the distance. Thus, if the pointer 509 is pointing to a particular item, here user interface actuation target 510, it may get larger as the electronic device 200 moves farther away from the content presentation companion device 300 while the other items stay the same, and so forth. When the electronic device 200 gets closer to the content presentation companion device 300, either all the static user interface elements, a combination of the static user interface elements, or a static user interface element to which the pointer 509 is pointing can get smaller.

Of course, as show at step set 411, this dynamic adjustment can continue to occur in real time as the distance 412 between the electronic device 200 and the content presentation companion device 300 changes. Illustrating by example, when a motion detector (220) carried by the electronic device 200 detects an amount of movement 513 of the electronic device 200 in three-dimensional space 213, the one or more processors (207) of the electronic device (200) can determine, with ultra-wideband component (212) carried by the electronic device 200, another distance 512 between the electronic device 200 and the content presentation companion device 300 using the ultra-wideband ranging process. When this occurs, step set 411 can comprise dynamically enhancing, with the one or more processors (207), the user interface of the content presentation companion device 300 as another function of the other distance 512 between the electronic device 200 and the content presentation companion device 300. In one or more embodiments, the enhancing occurring at step 411 again adjusts the user interface feature being presented on the content presentation companion device 300.

Figure 6:
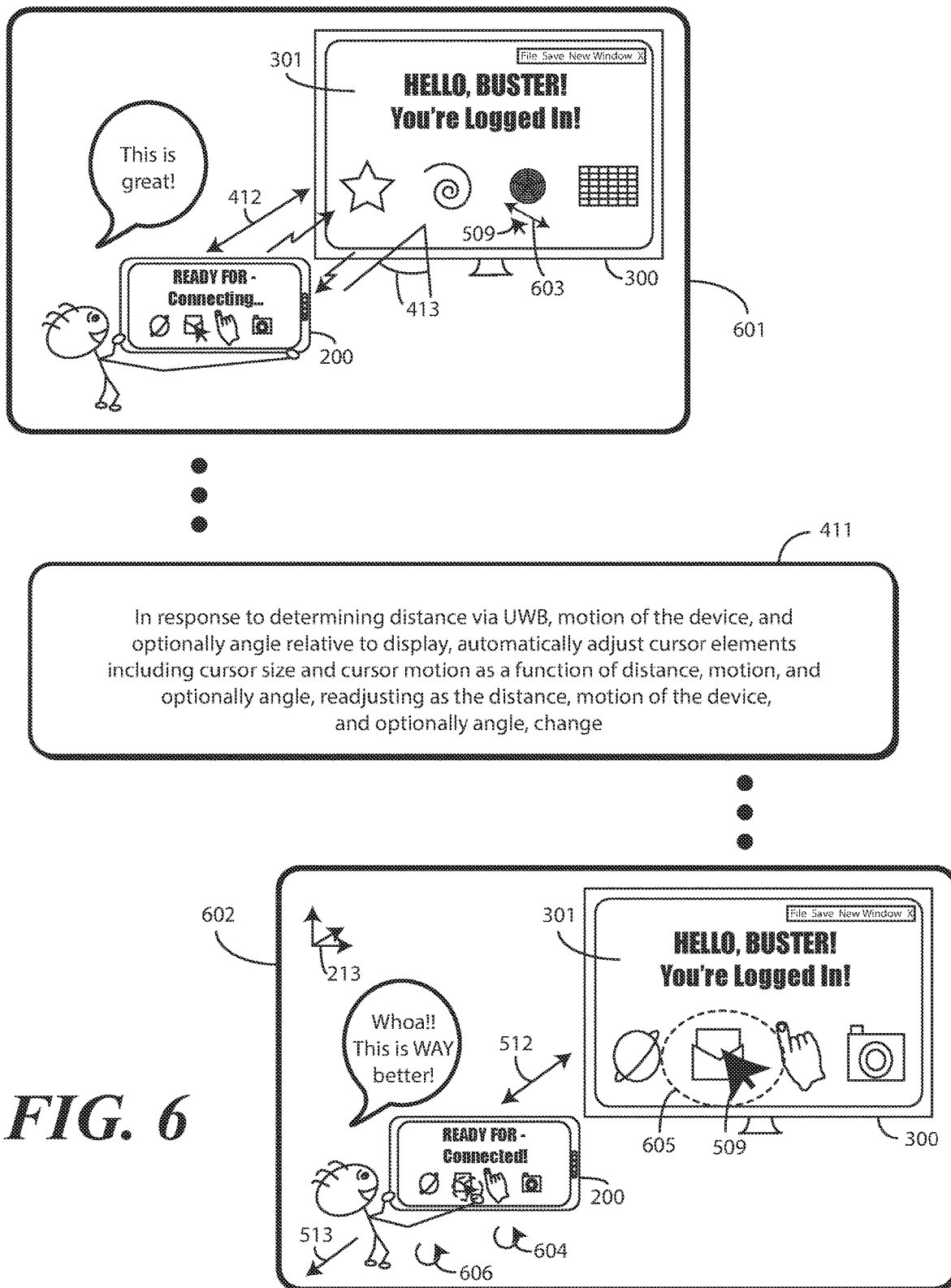
FIG. 6 illustrates one or more explanatory method steps in accordance with one or more embodiments of the disclosure.

Turning now to FIG. 6, illustrated therein is another set of one or more method steps for dynamically adjusting a user interface of a content presentation companion device 300 in accordance with one or more embodiments of the disclosure. As shown at step 601 an electronic device 200 includes a communication device (209) electronically communicating with a content presentation companion device 300 operating as a primary display for the electronic device 200. The electronic device 200 again includes an ultra-wideband component (212) electronically communicating with another ultra-wideband component (306) operating in the content presentation companion device 300.

In one or more embodiments, the one or more processors (207) of the electronic device 200 determine a distance 412 between the electronic device 200 and the content presentation companion device 300 by processing ultra-wideband ranging signals received from the ultra-wideband component (212). Then, at step set 411, the one or more processors (207) cause the communication device (209) of the electronic device 200 to transmit user interface adjustment signals to the content presentation companion device 300 that dynamically modify a user interface feature being presented on the primary display provided by the content presentation companion device 300 as a function of the distance 412.

In this illustrative embodiment, the user interface feature being modified by step set 411 is a dynamic user interface feature, examples of which include the size of a pointer 509 or the motion 603 of the pointer 509. As shown at step 602, in one or more embodiments the results of the enhancement occurring at step set 411 can include increasing the size of the pointer 509 as the electronic device 200 gets farther from the content presentation companion device 300, or vice versa. Additionally, a motion detector (220) carried by the electronic device 200 can detect an amount of motion 604 of the electronic device 200 in three-dimensional space 213 to control a corresponding amount of motion 605 of the pointer 509 on the display 301 of the content presentation companion device 300, with that amount of motion 605 getting smaller as the electronic device 200 moves away from the content presentation companion device 300, and vice versa, and with the amount of motion 605 being slower as the electronic device 200 moves away from the content presentation companion device 300, and vice versa. Said differently, in response to detecting the amount of motion 604 of the electronic device 200 in the three-dimensional space 213, in one or more embodiments the one or more processors (207) adjust a speed of movement of the pointer as a function of the distance 412 between the electronic device 200 and the content presentation companion device 300.

As before, the motion detector (220) carried by the electronic device 200 can continue to detect movement 513 of the electronic device 200 toward or away from the content presentation companion device 300 by another distance 512. Similarly, the motion detector (220) can detect another amount of motion 606 of the electronic device 20 in the three-dimensional space 213 at the new distance 512. Step set 411 can then comprise, in response to detecting the movement 513 of the electronic device 200 away from the content presentation companion device 300 and the other amount of motion 606 of the electronic device 200 in the three-dimensional space 213 again adjusting the speed of movement of the pointer 509 as a combined function of the other distance 512 and the other amount of motion 606. Similarly, step set 411 can comprise again adjusting the amount of motion 605 of the pointer 509 along the content presentation companion device 300 relative to the other amount of motion 606 of the electronic device 200 in the three-dimensional space 213 as well.

Thus, as shown in FIG. 6, in one or more embodiments an antenna array (210) carried by the electronic device 200, which functions as an angle of arrival sensor, can determine an angle between the communication device 209 and a major surface of the content presentation companion device 300 while a motion detector (220) detects motion of the electronic device 200 in three-dimensional space 213. This information provided by these one or more sensors then control a speed of motion and distance of motion of a pointer 509 presented on the content presentation companion device 300. In one or more embodiments, this occurs in response to the amount of motion of the electronic device 200 in three-dimensional space 213 and as a function of the distance and the angle.

Figure 7:
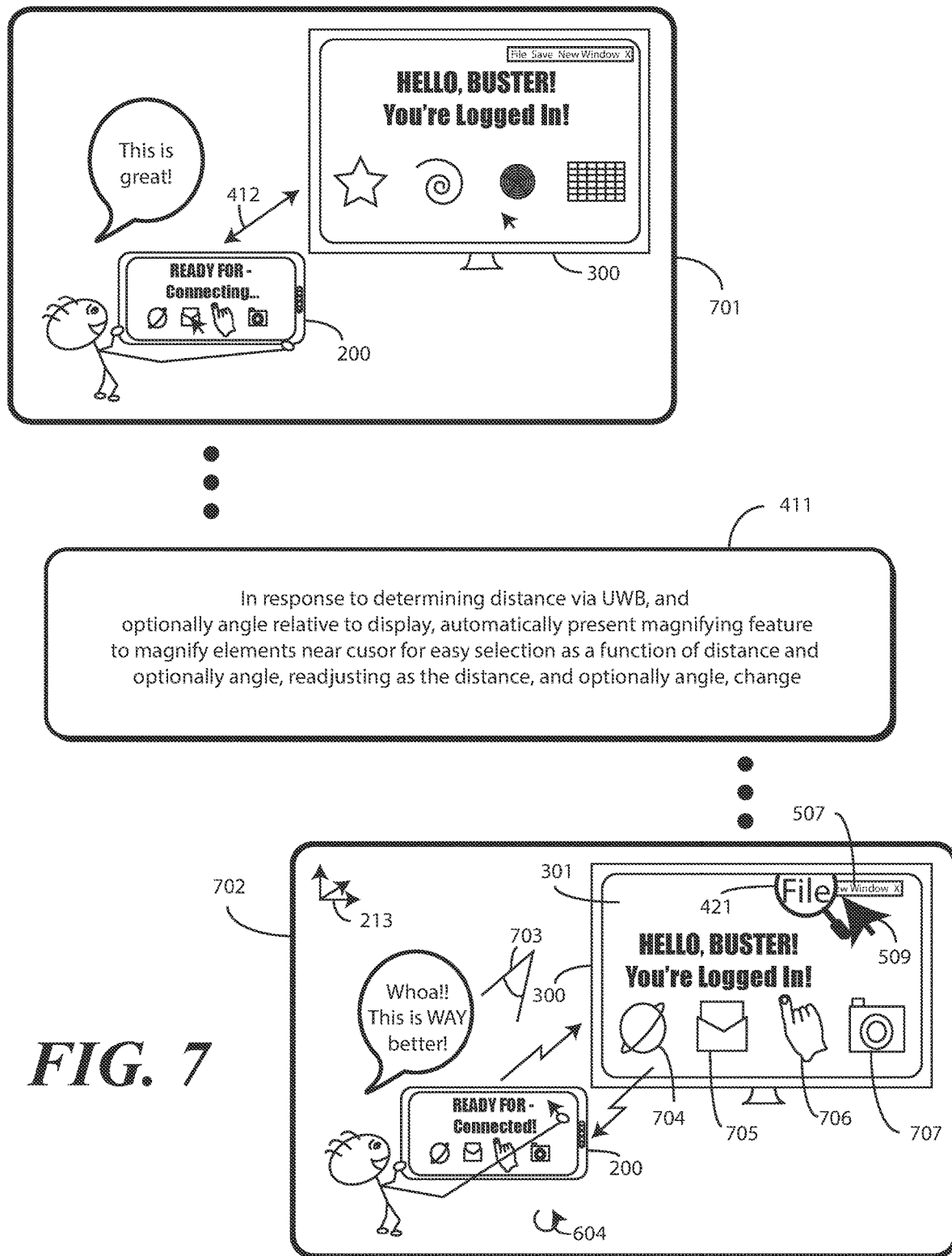
FIG. 7 illustrates one or more explanatory method steps in accordance with one or more embodiments of the disclosure.

Turning now to FIG. 7, illustrated therein are additional method steps that can occur in accordance with one or more embodiments of the disclosure. Beginning at step 701, illustrated therein is a system comprising an electronic device 200 comprising an ultra-wideband component (212), a communication device (209), and one or more processors (207). The system also includes a content presentation companion device 300 electronically in communication with the electronic device 200. In one or more embodiments, the content presentation companion device 300 comprises another ultra-wideband component (306).

As previously described, in one or more embodiments the one or more processors (207) identify a distance 412 between the electronic device 200 and the content presentation companion device 300 by processing signals from the ultra-wideband component (212). At step set 411, the one or more processors (207) cause the communication device (209) to magnify a presentation characteristic of content being presented at the content presentation companion device 300 as a function of the distance 412.

As shown at step 403, this magnification can occur in a variety of ways. In one or more embodiments, the one or more processors (207) cause the communication device (209) to magnify the presentation characteristic of the content by superimposing a virtual magnifying glass 421 atop a portion of the content. In one or more embodiments, only the portion of the content situated within the perimeter of the virtual magnifying glass 421 is magnified, while other portions that are complementary to this portion, i.e., portions of the content outside the perimeter of the virtual magnifying glass 421, remaining unmagnified.

As before, an antenna array (210) carried by the electronic device 200 can act as an angle of arrival sensor to determine an angle 703 between the communication device (209) and a major surface of the content presentation companion device 300. A motion detector (220) can detect motion 604 of the electronic device 200 in three-dimensional space 213. In one or more embodiments, the electronic device 200, or more particularly the one or more processors (207) of the electronic device 200 operating in conjunction with these sensors, then control a speed of motion and distance of motion of the virtual magnifying glass 421 presented on the content presentation companion device 300 in response to the motion 605 of the electronic device 200 in three-dimensional space 213 and as a function of the distance 412 and the angle 703.

In one or more embodiments, the speed of motion and the distance of motion of the virtual magnifying glass 421 occurs as did the pointer 509 in FIG. 6. To wit, the motion detector (220) carried by the electronic device 200 can detect an amount of motion 604 of the electronic device 200 in three-dimensional space 213 to control a corresponding amount of motion of the virtual magnifying glass 421 on the display 301 of the content presentation companion device 300, with that amount of motion getting smaller as the electronic device 200 moves away from the content presentation companion device 300, and vice versa, and with the amount of motion being slower as the electronic device 200 moves away from the content presentation companion device 300, and vice versa.

As before, the motion detector (220) carried by the electronic device 200 can continue to detect movement of the electronic device 200 toward or away from the content presentation companion device 300 by another distance. Similarly, the motion detector (220) can detect another amount of motion of the electronic device 20 in the three-dimensional space 213 at the new distance. Step set 411 can then comprise, in response to detecting the movement of the electronic device 200 away from the content presentation companion device 300 and the other amount of motion of the electronic device 200 in the three-dimensional space 213 again adjusting the speed of movement of the virtual magnifying glass 421 as a combined function of the other distance and the other amount of motion. Similarly, step set 411 can comprise again adjusting the amount of movement of the virtual magnifying glass 421 along the content presentation companion device 300 relative to the other amount of motion of the electronic device 200 in the three-dimensional space 213 as well.

In other embodiments, the enhancement occurring at step set 411 that causes the magnifying of the one or more user interface elements to occur at step 702 can take other forms as well. Illustrating by example, in one or more embodiments the user interface element being magnified comprises a user interaction element defined by a user actuation target 704, which has been magnified at step 702. Similarly, the user interaction element can comprise a plurality of user actuation targets 704,705,706,707, each of which have been magnified at step 702. The user interaction element could be a user actuation target 707 (or a plurality of user actuation targets) being associated with a window 507 being presented on the content presentation companion device 300. The amount of magnification can be a function of the distance 412, as described above with reference to the pointer 509 of FIG. 6 or the virtual magnifying glass 421 (where employed) of FIG. 7.

Thus, FIG. 7 illustrates embodiments of the disclosure where and electronic device 200 includes a communication device (209) electronically communicating with a content presentation companion device 300 operating as a primary display for the electronic device 200. The electronic device 200 includes an ultra-wideband component (212) electronically communicating with another ultra-wideband component (306) operating in the content presentation companion device 300. One or more processors (207) determine a distance 412 between the electronic device 200 and the content presentation companion device 300 by processing ultra-wideband ranging signals received from the ultra-wideband component (212) and cause the communication device (209) to transmit user interface adjustment signals to the content presentation companion device 300 that dynamically magnify a user interface feature being presented on the primary display provided by the content presentation companion device 300 as a function of the distance 412.

In one or more embodiments when a pointer 509 is being presented on the primary display provided by the content presentation companion device 300, the user interface adjustment signals cause dynamic magnification only to virtual objects present on the primary display to which the pointer is pointing as shown at step 702. This can include causing the presentation of a virtual magnifying glass 421 on the primary display provided by the content presentation companion device 300 with the dynamic magnification occurring within a perimeter of the virtual magnifying glass 421, as previously described.

Figure 8:
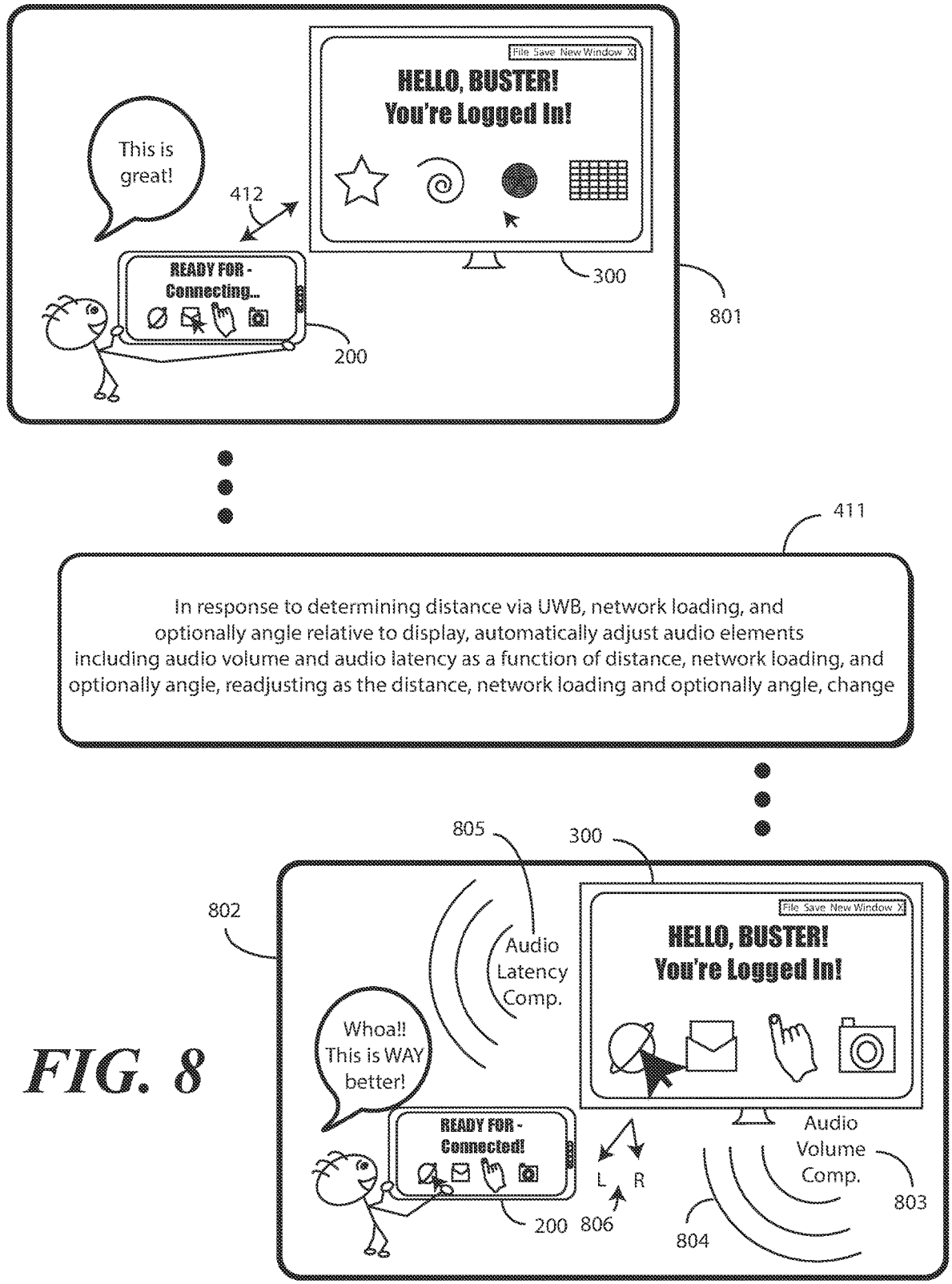
FIG. 8 illustrates one or more explanatory method steps in accordance with one or more embodiments of the disclosure.

Turning now to FIG. 8, illustrated therein are still other method steps that can occur in accordance with one or more embodiments of the disclosure. Beginning at step 801, as system includes an electronic device 200 comprising an ultra-wideband component (212), a communication device (209), and one or more processors (207). The system includes a content presentation companion device 300 device electronically in communication with the electronic device 200. The content presentation companion device 300 includes another ultra-wideband component (306), which could be an ultra-wideband tag, an integrated ultra-wideband component, or other ultra-wideband communication ready device.

As before, the one or more processors (207) identify a distance 412 between the electronic device 200 and the content presentation companion device 300 by processing signals from the ultra-wideband component (212). At step set 411, the one or more processors (207) cause the communication device (209) to adjust a user interface presentation characteristic associated with the content presentation companion device 300 as a function of the distance 412. While the user interface presentation characteristic of FIGS. 5-7 was visual, the user interface presentation characteristic of FIG. 8 is aural. Specifically, the user interface presentation characteristic is an audio performance characteristic 803 associated with audio content 804 being delivered by the content presentation companion device 300.

The audio performance characteristic 803 can take various forms. Illustrating by example, as shown at step 802, in one or more embodiments the audio performance characteristic 803 comprises an amount of audio latency 805. In another embodiment, the audio performance characteristic 803 comprises a balance 806 of an audio signal emanating from the content presentation companion device 300. In still another embodiment, the audio performance characteristic 803 comprises a volume level associated with the audio content 804 emanating from, or being delivered by, the content presentation companion device 300. Illustrating by example, the volume level can get louder when the distance 412 between the electronic device 200 and the content presentation companion device 300 is larger and can get quieter when the distance 412 between the electronic device 200 and the content presentation companion device 300 is smaller, and so forth.

Similarly, when an antenna array (210) functions as an angle of arrival sensor determining an angle between the communication device (209) and a major surface of the content presentation companion device 300, the balance 806 can be adjusted to compensate for the position of the electronic device 200 relative to the content presentation companion device 300 as well.

Thus, as shown in FIG. 8, an electronic device 200 can include a communication device (209) electronically communicating with a content presentation companion device 300 operating as a primary display for the electronic device 200. The electronic device 200 can include an ultra-wideband component (212) electronically communicating with another ultra-wideband component (306) operating in the content presentation companion device 300.

One or more processors (207) of the electronic device 200 can determine a distance 412 between the electronic device 200 and the content presentation companion device 300 by processing ultra-wideband ranging signals received from the ultra-wideband component (212). Then, at step set 411, the one or more processors (207) can cause the communication device (209) to adjust an audio performance characteristic 803 associated with audio content 804 being delivered by the content presentation companion device 300 as a function of the distance 412.

As before, the electronic device 200 can include an angle of arrival detector that determines an angle of arrival between the electronic device 200 and the content presentation companion device 300. The one or more processors (207) can cause the communication device (209) to further adjust the audio performance characteristic 803 as a function of the angle of arrival, either by itself or in combination with the distance 412.

Figure 9:
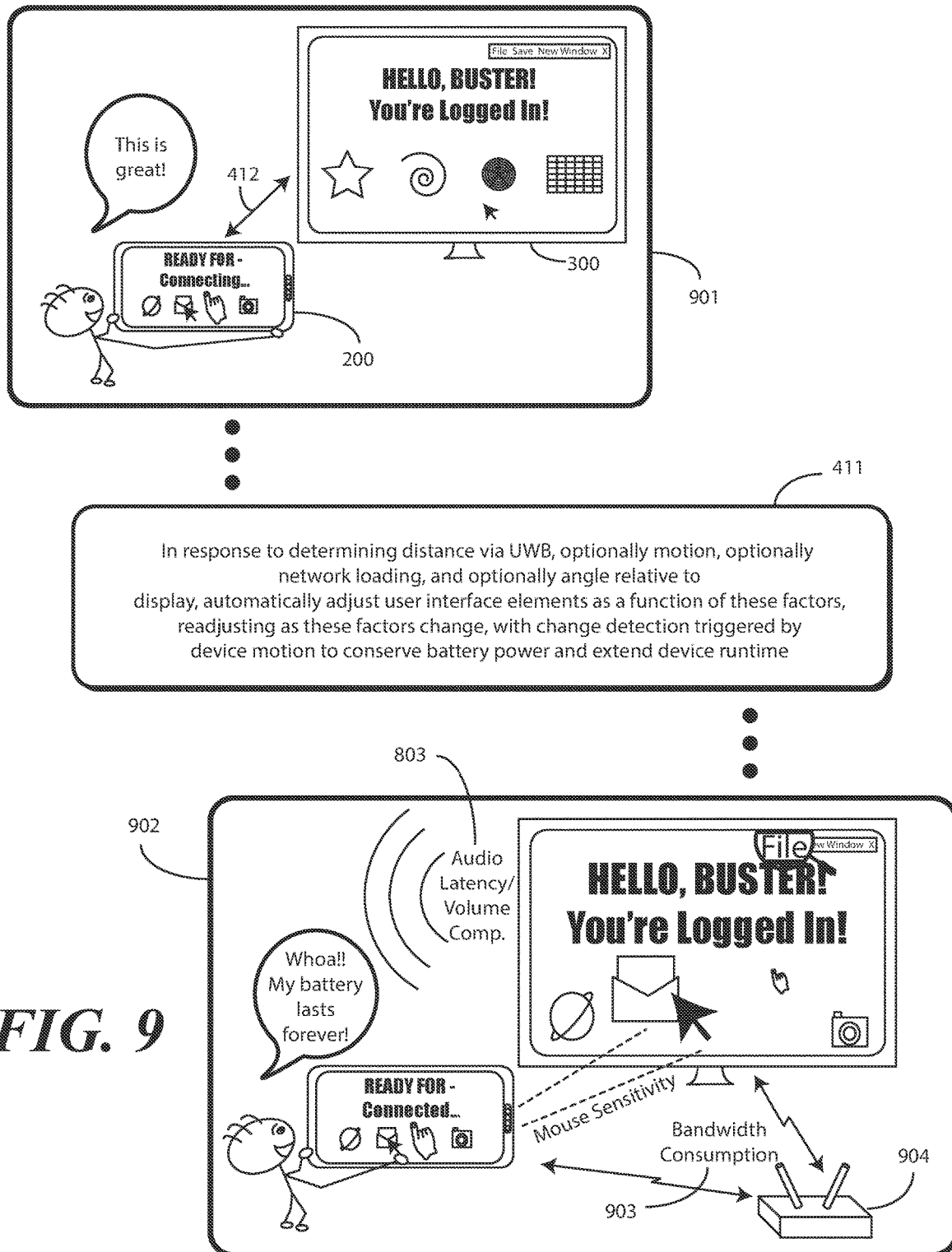
FIG. 9 illustrates one or more explanatory method steps in accordance with one or more embodiments of the disclosure.

While distance and angle of arrival are primary factors for adjusting visual and aural user interface elements being presented on a content presentation companion device, embodiments of the disclosure are not so limited. Turning now to FIG. 9, illustrated therein is one example in which additional factors are used to enhance the user interface of a content presentation companion device.

At step 901, the electronic device 200 is equipped with a context engine (218) operable with the various sensors (214) of the electronic device 200 to detect, infer, capture, and otherwise determine operating characteristics of the electronic device 200. In one or more embodiments, the context engine (218) functions as a network loading sensor that determines an amount of loading 903 of a network 904 facilitating communication between the communication device (209) of the electronic device 200 and the content presentation companion device 300. In one or more embodiments, in step set 411 the one or more processors (207) of the electronic device 200 cause the communication device (209) to further adjust the audio performance characteristic 803 the amount of loading 903. This adjustment can be done in addition to, or instead of, one or both of the distance 412 between the electronic device 200 and the content presentation companion device 300 and/or the angle of arrival.

Illustrating by example, as shown at step 902 embodiments of the disclosure contemplate when the amount of loading 903 of the network 904 is high, latency might increase. Accordingly, the one or more processors (207) can enhance the audio performance characteristic 803 to compensate for this increased latency in one or more embodiments. For instance, the communication device (209) or the context engine (218) can determine the amount of loading 903 of the network 904 to allow the one or more processors (207) to cause the communication device (209) to further adjust the audio performance characteristic 803 as a function of the amount of loading. This can be done in addition to adjustments made as a function of the distance 412 and angle of arrival, as previously described with reference to FIG. 8.

Another feature illustrated in FIG. 9 corresponds to power management. In one or more embodiments, the electronic device 200 is equipped with a power manager (221). The power manager (221) can ensure that adjustments to one or both of visual user interface elements or the audio performance characteristic 803 occur only in response to movement of the electronic device 200 relative to the content presentation companion device 300. If, for example, the visual user interface elements and the audio performance characteristic 803 have been adjusted at step set 411, and the electronic device 200 remains at a constant distance and angle of arrival relative to the content presentation companion device 300, embodiments of the disclosure contemplate that it is unnecessary to constantly continue to make adjustments.

Accordingly, in one or more embodiments when the electronic device 200 is equipped with a motion detector (220) determining whether motion of the electronic device 200 occurs changing the distance 412 between the electronic device 200 and the content presentation companion device 300, the power manager (221) ensures that the ultra-wideband component (212) carried by the electronic device 200 repeatedly determines the distance 412 between the electronic device 200 and the content presentation companion device 300 using the ultra-wideband ranging process at a frequency determined as a function of whether the distance 412 is changing. In one or more embodiments, the frequency is higher when the distance 412 is changing than when the electronic device 200 is stationary. Said differently, in one or more embodiments when the motion detector (220) determines the electronic device 200 is moving relative to the content presentation companion device 300, at step set 411 the one or more processors (207) repeat causing the communication device (209) to adjust the audio performance characteristic 803. This repetition occurs more when the electronic device 200 is moving than when the electronic device 200 is stationary. One example of the audio performance characteristic is a latency amount associated with the audio being delivered by the content presentation companion device 300. Other features can be changed in response to detected motion—rather than continually—as well to save power and extend the run time of the electronic device 200.

Figure 10:
FIG. 10 illustrates various embodiments of the disclosure.
Figure 11:
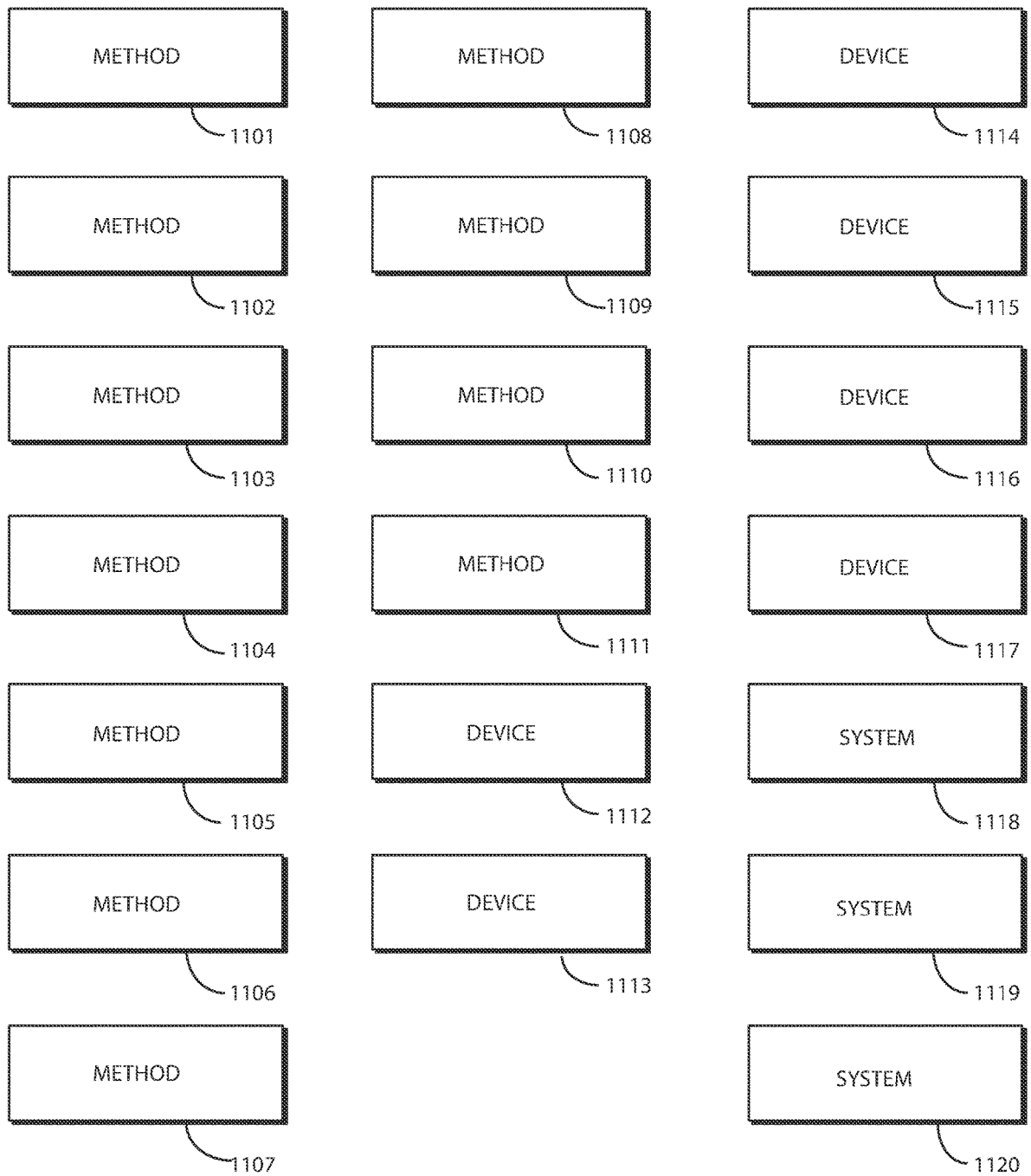
FIG. 11 illustrates various embodiments of the disclosure.
Figure 12:
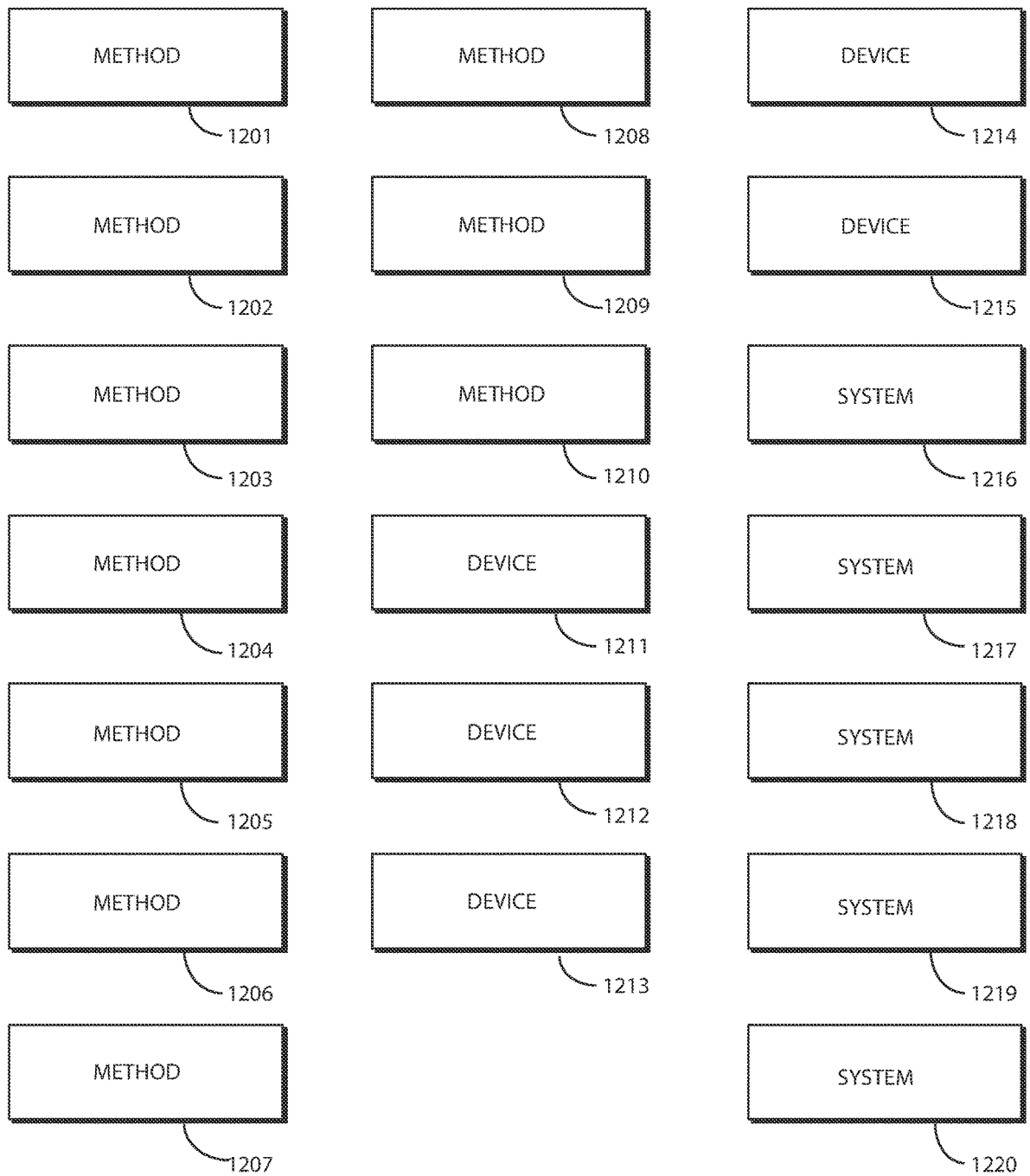
FIG. 12 illustrates various embodiments of the disclosure.

Turning now to FIGS. 10-12, illustrated therein are various embodiments of the disclosure. The embodiments of FIGS. 10-12 are shown as labeled boxes in FIGS. 10-12 due to the fact that the individual components of these embodiments have been illustrated in detail in FIGS. 1-9, which precede FIGS. 10-12. Accordingly, since these items have previously been illustrated and described, their repeated illustration is no longer essential for a proper understanding of these embodiments. Thus, the embodiments are shown as labeled boxes.

At 1001, a method in an electronic device comprises detecting, with one or more processors, a communication device electronically in communication with a content presentation companion device operating as a primary display for the electronic device. At 1001, the content presentation companion device comprises a first ultra-wideband component.

At 1001, the method comprises determining, with a second ultra-wide component carried by the electronic device, a distance between the electronic device and the content presentation companion device using an ultra-wideband ranging process. At 1001, the method comprises dynamically enhancing, with the one or more processors, a user interface of the content presentation companion device as a function of the distance between the electronic device and the content presentation companion device. At 1001, the enhancing adjusts a user interface feature being presented on the content presentation companion device.

At 1002, the user interface feature of 1001 comprises a static user interface feature. At 1003, the static user interface feature of 1002 comprises a font being presented on the content presentation companion device. At 1004, the static user interface feature of 1002 comprises a resolution of one or more images being presented on the content presentation companion device. At 1005, the static user interface feature of 1002 comprises a window size of a window being presented on the content presentation companion device.

At 1006, the user interface feature of 1001 comprises a dynamic user interface feature. At 1007, the dynamic user interface feature comprises a pointer size of a pointer being presented on the content presentation companion device.

At 1008, the method of 1007 further comprises detecting, with a motion detector carried by the electronic device, an amount of motion of the electronic device in three-dimensional space. At 1008, in response to detecting the amount of motion of the electronic device, the method comprises adjusting, with the one or more processors, a speed of movement of the pointer as a combined function of the distance and the amount of motion of the electronic device in the three-dimensional space.

At 1009, the method of 1001 further comprises determining, with an antenna array carried by the electronic device, an angle of arrival at which signals delivered by the communication device to the content presentation companion device intersect a major face of the content presentation companion device. At 1009, the method comprises adjusting a movement sensitivity of the pointer along the content presentation companion device as a function of the angle of arrival.

At 1010, the method of 1009 further comprises detecting, with the motion detector carried by the electronic device, movement of the electronic device away from the content presentation companion device by another distance and another amount of motion of the electronic device in the three-dimensional space. At 1010, in response to detecting the movement of the electronic device away from the content presentation companion device and the other amount of motion of the electronic device in the three-dimensional space, the method comprises again adjusting the speed of movement of the pointer as a combined function of the another distance and the another amount of motion and again adjusting the amount of movement of the pointer along the content presentation companion device relative to the another amount of motion of the electronic device in the three-dimensional space.

At 1011, the method of 1001 further comprises detecting, with a motion detector carried by the electronic device, motion of the electronic device. At 1011, in response to detecting the motion of the electronic device, the method comprises determining, with the second ultra-wide component, another distance between the electronic device and the content presentation companion device using the ultra-wideband ranging process and dynamically enhancing, with the one or more processors, the user interface of the content presentation companion device as another function of the another distance between the electronic device and the content presentation companion device, the enhancing again adjusting the user interface feature being presented on the content presentation companion device.

At 1012, an electronic device comprises a communication device electronically communicating with a content presentation companion device operating as a primary display for the electronic device. At 1012, the electronic device comprises an ultra-wideband component electronically communicating with another ultra-wideband component operating in the content presentation companion device.

At 1012, one or more processors of the electronic device determine a distance between the electronic device and the content presentation companion device by processing ultra-wideband ranging signals received from the ultra-wideband component. At 1012, the one or more processors cause the communication device to transmit user interface adjustment signals to the content presentation companion device that dynamically modify a user interface feature being presented on the primary display as a function of the distance.

At 1013, the electronic device of 1012 further comprises an antenna array carried by the electronic device. At 1013, the antenna array determines an angle of arrival defined between signals delivered by the communication device to the content presentation companion device and a major face of the content presentation companion device. At 1013, the user interface adjustment signals cause the user interface feature to transition to a presentation mode when the angle of arrival is greater than ninety degrees. At 1014, the user interface adjustment signals 1013 cause the user interface feature to transition to an editor mode when the angle of arrival is less than ninety degrees.

At 1015, the electronic device of 1012 further comprises a motion detector. At 1015, the one or more processors determine another distance between the electronic device and the content presentation companion device by processing other ultra-wideband ranging signals received from the ultra-wideband component when the motion detector detects movement of the electronic device away from the content presentation companion device. At 1015, the one or more processors cause the communication device to transmit other user interface adjustment signals to the content presentation companion device that dynamically again modify the user interface feature being presented on the primary display as a function of the other distance.

At 1016, the user interface feature of 1012 comprises a display resolution occurring at the primary display. At 1017, the user interface feature of 1012 comprises a font size presented at the primary display. At 1018, the user interface feature of 1012 comprises a size of a window being presented at the content presentation companion device.

At 1019, a system comprises an electronic device comprising an ultra-wideband component, a communication device, and one or more processors. At 1019, the system comprises a content presentation companion device electronically in communication with the electronic device and comprising another ultra-wideband component.

At 1019, the one or more processors identify a distance between the electronic device and the content presentation companion device by processing signals from the ultra-wideband component. At 1019, the one or more processors cause the communication device to adjust a presentation characteristic of content being presented at the content presentation companion device as a function of the distance.

At 1020, the electronic device of 1019 further comprises an angle of arrival sensor determining an angle between the communication device and a major surface of the content presentation companion device. At 1020, the one or more processors of the electronic device control speed a presentation mode of the content presentation companion as a function of the distance and the angle.

Turning now to FIG. 11, at 1101 a method in an electronic device comprises detecting, with one or more processors, a communication device electronically in communication with a content presentation companion device operating as a primary display for the electronic device and comprising a first ultra-wideband component. At 1101, the method comprises determining, with a second ultra-wideband tag component carried by the electronic device, a distance between the electronic device and the content presentation companion device using an ultra-wideband ranging process.

At 1101, the method comprises dynamically enhancing, with one or more processors, a user interface of the content presentation companion device as a function of the distance between the electronic device and the content presentation companion device. At 1101, the enhancing magnifies a user interface element being presented on the content presentation companion device.

At 1102, the user interface element of 1101 comprises a user interaction element. At 1103, the user interface element of 1102 comprises a plurality of user actuation targets. At 1104, the plurality of user actuation targets of 1103 is associated with a window being presented on the content presentation companion device.

At 1105, the enhancing occurring at 1101 comprises presenting a virtual magnifying glass atop content being presented on the content presentation companion device to cause the magnifying of the user interface element on the content presentation companion device. At 1106, the magnification of 1105 occurs as a function of the distance. At 1107, a size of the virtual magnifying glass of 1106 is determined as another function of the distance.

At 1108, the method of 1106 further comprises detecting, with a motion detector carried by the electronic device, an amount of motion of the electronic device in three-dimensional space. At 1108, in response to detecting the motion of the electronic device, the method comprises moving the virtual magnifying glass. At 1109, the method of 1108 further comprises adjusting, with the one or more processors, a speed of movement of the virtual magnifying glass as a combined function of the distance and the amount of motion of the electronic device in the three-dimensional space.

At 1110, the method of 1101 further comprises determining, with an antenna array carried by the electronic device, an angle of arrival at which signals delivered by the communication device to the content presentation companion device intersect a major face of the content presentation companion device. At 1110, the method comprises adjusting a smoothness of movement of the virtual magnifying glass along the content presentation companion device as a function of the angle of arrival. At 1111, the magnifying of 1101 only occurs within a perimeter of the virtual magnifying glass.

At 1112, an electronic device comprises a communication device electronically communicating with a content presentation companion device operating as a primary display for the electronic device. At 1112, the electronic device comprises an ultra-wideband component electronically communicating with another ultra-wideband component operating in the content presentation companion device.

At 1112, the electronic device comprises one or more processors determining a distance between the electronic device and the content presentation companion device by processing ultra-wideband ranging signals received from the ultra-wideband component. At 1112, the one or more processors cause the communication device to transmit user interface adjustment signals to the content presentation companion device that dynamically magnify a user interface feature being presented on the primary display as a function of the distance.

At 1113, when a pointer is being presented on the primary display, the user interface adjustment signals of 1112 cause dynamic magnification only to virtual objects present on the primary display to which the pointer is pointing.

At 1114, the user interface adjustment signals of 1112 cause presentation of a virtual magnifying glass on the primary display. At 1115, the user interface adjustment signals of 1114 cause dynamic magnification of content present on the primary display within a perimeter of the virtual magnifying glass.

At 1116, the electronic device of 1115 further comprises a motion detector detecting motion of the electronic device in three-dimensional space. At 1116, the user interface adjustment signals cause motion of the virtual magnifying glass along the primary display as a function of the distance and in proportion to the motion of the electronic device in the three-dimensional space.

At 1117, the electronic device of 1116 further comprises an antenna array carried by the electronic device. At 1117, the antenna array is operable to determine an angle of arrival defined between signals delivered by the communication device to the content presentation companion device and a major face of the content presentation companion device. At 1117, an amount of motion of the virtual magnifying glass relative to the amount of motion of the electronic device in the three-dimensional space is defined as a function of the angle of arrival.

At 1118, a system comprises an electronic device comprising an ultra-wideband component, a communication device, and one or more processors. At 1118, the electronic device comprises a content presentation companion device electronically in communication with the electronic device and comprising another ultra-wideband component.

At 1118, the one or more processors identify a distance between the electronic device and the content presentation companion device by processing signals from the ultra-wideband component. At 1118, the one or more processors cause the communication device to magnify a presentation characteristic of content being presented at the content presentation companion device as a function of the distance.

At 1119, the one or more processors of 1118 cause the communication device to magnify the presentation characteristic of the content by superimposing a virtual magnifying glass atop a portion of the content. At 1119, only the portion of the content is magnified. Other portions of the content that are complementary to the portion of the content remain unmagnified.

At 1120, the electronic device of the system of 1119 further comprises an angle of arrival sensor determining an angle between the communication device and a major surface of the content presentation companion device. At 1120, the one or more processors of the electronic device of the system control a presentation mode of the content presentation companion device as a function of the distance and the angle.

Turning now to FIG. 12, at 1201 a method in an electronic device comprises detecting, with one or more processors, a communication device electronically in communication with a content presentation companion device operating as a primary display for the electronic device and comprising a first ultra-wideband component. At 1201, the method comprises determining, with a second ultra-wideband tag component carried by the electronic device, a distance between the electronic device and the content presentation companion device using an ultra-wideband ranging process. At 1201, the method comprises dynamically enhancing, with one or more processors, an audio performance characteristic of the content presentation companion device as a function of the distance between the electronic device and the content presentation companion device.

At 1202, the audio performance characteristic of 1201 comprises a volume level. At 1203, the audio performance characteristic of 1201 comprises an audio latency amount.

At 1204, the method of 1201 further comprises detecting, with a motion detector carried by the electronic device, motion of the electronic device. At 1204, in response to detecting the motion of the electronic device, the method comprises determining, with the second ultra-wideband tag component, another distance between the electronic device and the content presentation companion device using the ultra-wideband ranging process and dynamically enhancing, with the one or more processors, the audio performance characteristic of the content presentation companion device again as a function of the other distance.

At 1205, the method of 1201 further comprises determining, from signals received by the communication device, an amount of loading borne by a network facilitating communication between the communication device and the content presentation companion device. At 1205, the dynamic enhancement of the audio performance characteristic occurs further as a function of the loading.

At 1206, the method of 1201 further comprises determining, with an antenna array carried by the electronic device, an angle of arrival at which signals delivered by the communication device to the content presentation companion device intersect a major face of the content presentation companion device. At 1206, one or more processors of the electronic device control a presentation mode of the content presentation companion device as a function of the angle of arrival.

At 1207 the audio performance characteristic of 1206 comprises an amount of audio latency. At 1208 the audio performance characteristic of 1206 comprises a balance of an audio signal emanating from the content presentation companion device.

At 1209, the method of 1208 further a motion sensor determining whether motion of the electronic device occurs changing the distance between the electronic device and the content presentation companion device. At 1209, the second ultra-wideband component repeatedly determines the distance between the electronic device and the content presentation companion device using the ultra-wideband ranging process with a frequency determined as a function of whether the distance is changing. At 1210, the frequency of 1209 is higher when the distance is changing.

At 1211, an electronic device comprises a communication device electronically communicating with a content presentation companion device operating as a primary display for the electronic device. At 1211, the electronic device comprises an ultra-wideband component electronically communicating with another ultra-wideband component operating in the content presentation companion device.

At 1211, the electronic device comprises one or more processors determining a distance between the electronic device and the content presentation companion device by processing ultra-wideband ranging signals received from the ultra-wideband component. At 1211, the one or more processors cause the communication device to adjust an audio performance characteristic associated with audio being delivered by the content presentation companion device as a function of the distance.

At 1212, the electronic device of 1211 further comprises an angle of arrival detector determining an angle of arrival between the electronic device and the content presentation companion device. At 1212, the one or more processors cause the communication device to further adjust the audio performance characteristic as a function of the angle of arrival.

At 1213, the communication device of 1212 further determines an amount of loading of a network facilitating communication between the communication device and the content presentation companion device. At 1213, the one or more processors cause the communication device to further adjust the audio performance characteristic as a function of the amount of loading.

At 1214, the audio performance characteristic of 1213 comprises a volume associated with the audio being delivered by the content presentation companion device. At 1215, the audio performance characteristic of 1213 comprises a latency associated with the audio being delivered by the content presentation companion device.

At 1216, a system comprises an electronic device comprising an ultra-wideband component, a communication device, and one or more processors. At 1216, the system comprises a content presentation companion device electronically in communication with the electronic device and comprising another ultra-wideband component.

At 1216, the one or more processors of the electronic device identify a distance between the electronic device and the content presentation companion device by processing signals from the ultra-wideband component. At 1216, the one or more processors cause the communication device to adjust an audio presentation characteristic associated with audio content being delivered by the content presentation companion device as a function of the distance.

At 1217, the system of 1216 further comprises an angle of arrival sensor determining an angle between the communication device and a major surface of the content presentation companion device. At 1217, the system comprises a network loading sensor determining an amount of loading of a network facilitating communication between the communication device and the content presentation companion device. At 1218, the one or more processors of 1217 cause the communication device to further adjust the audio presentation characteristic as a function of the angle and the amount of loading.

At 1219, the system of 1218 further comprises a motion detector determining whether the electronic device is moving relative to the content presentation companion device. At 1219, the one or more processors repeat the causing the communication device to adjust the audio presentation characteristic more when the electronic device is moving than when the electronic device is stationary. At 1220, the audio presentation characteristic of 1219 comprises a latency amount associated with the audio being delivered by the content presentation companion device.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims.

Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. A method in an electronic device, the method comprising:
   detecting, with one or more processors, a communication device electronically in communication with a content presentation companion device operating as a primary display for the electronic device using a content redirection feature where content presented on the content presentation companion device where content is received by one or more other processors of the electronic device from a remote electronic device and then redirected to the content presentation companion device for presentation and comprising a first ultra-wideband component;
   determining, with a second ultra-wide component carried by the electronic device, a distance between the electronic device and the content presentation companion device using an ultra-wideband ranging process;
   dynamically enhancing, with the one or more processors, a user interface of the content presentation companion device as a function of the distance between the electronic device and the content presentation companion device, the enhancing adjusting a user interface feature being presented on the content presentation companion device; and
   causing, by the one or more processors, presentation of a magnification element magnifying a presentation characteristic of content situated within a perimeter of the magnification element as a function of the distance;
   the user interface feature comprising a dynamic user interface feature and the magnification element comprising a virtual magnifying glass;
   the dynamic user interface feature comprising a pointer size of a pointer being presented on the content presentation companion device; and
   further comprising:
      detecting, with a motion detector carried by the electronic device, an amount of motion of the electronic device in three-dimensional space;
      in response to detecting the amount of motion of the electronic device;
      adjusting, with the one or more processors, a speed of movement of the pointer as a combined function of the distance and the amount of motion of the electronic device in the three-dimensional space; and
      causing motion of the virtual magnifying glass along the primary display as a function of the distance and in proportion to the motion of the electronic device in the three-dimensional space;
      determining, with an antenna array carried by the electronic device, an angle of arrival at which signals delivered by the communication device to the content presentation companion device intersect a major face of the content presentation companion device; and
      adjusting a movement sensitivity of the pointer along the content presentation companion device as a function of the angle of arrival; and
      wherein a movement amount of the virtual magnifying glass relative to the motion of the electronic device in three-dimensional space is defined as a function of the angle of arrival.

2. The method of claim 1, the virtual magnifying glass presented atop content on the primary display.

3. The method of claim 2, the content comprising a font being presented on the content presentation companion device.

4. The method of claim 2, the virtual magnifying glass magnifying the content.

5. The method of claim 1, wherein a size of the virtual magnifying glass gets larger when the distance gets larger static user interface feature comprising a window size of a window being presented on the content presentation companion device.

6. The method of claim 1, wherein a size of the virtual magnifying glass is a function of the distance.

7. The method of claim 1, wherein the pointer size gets larger as the distance gets larger.

8. The method of claim 1, wherein the pointer size is adjusted as a function of the distance.

9. The method of claim 1, wherein the virtual magnifying glass is created when the pointer hovers near items having more than one clickable user interface.

10. The method of claim 1, further comprising:
    detecting, with the motion detector carried by the electronic device, movement of the electronic device away from the content presentation companion device by another distance and another amount of motion of the electronic device in the three-dimensional space; and
    in response to detecting the movement of the electronic device away from the content presentation companion device and the another amount of motion of the electronic device in the three-dimensional space:
       again adjusting the speed of movement of the pointer as a combined function of the another distance and the another amount of motion; and
       again adjusting the amount of movement of the pointer along the content presentation companion device relative to the another amount of motion of the electronic device in the three-dimensional space.

11. The method of claim 1, further comprising:
    in response to detecting the motion of the electronic device:
       determining, with the second ultra-wide component, another distance between the electronic device and the content presentation companion device using the ultra-wideband ranging process; and
       dynamically enhancing, with the one or more processors, the user interface of the content presentation companion device as another function of the another distance between the electronic device and the content presentation companion device, the enhancing again adjusting the user interface feature being presented on the content presentation companion device.

12. An electronic device, comprising:
    a communication device electronically communicating with a content presentation companion device operating as a primary display for the electronic device in which the electronic device receives content from a streaming service and redirects the content received from the streaming service to the content presentation companion device;

an ultra-wideband component electronically communicating with another ultra-wideband component operating in the content presentation companion device; and one or more processors determining a distance between the electronic device and the content presentation companion device by processing ultra-wideband ranging signals received from the ultra-wideband component, and causing the communication device to transmit user interface adjustment signals to the content presentation companion device that dynamically modify a user interface feature being presented on the primary display by magnifying the user interface feature when the user interface feature is within a perimeter of a magnifying element with the magnifying occurring as a function of the distance; and further comprising an antenna array carried by the electronic device and determining an angle of arrival defined between signals delivered by the communication device to the content presentation companion device and a major face of the content presentation companion device, wherein the user interface adjustment signals cause motion of the magnifying element along the primary display to occur with an amount of the motion defined as a function of the angle of arrival.

13. The electronic device of claim 12, wherein magnifying element is created along the primary display when a pointer hovers near items on the primary display.

14. The electronic device of claim 12, wherein the magnifying element comprises a virtual magnifying glass and the perimeter is round.

15. The electronic device of claim 12, further comprising a motion detector, the one or more processors determining another distance between the electronic device and the content presentation companion device by processing other ultra-wideband ranging signals received from the ultra-wideband component when the motion detector detects movement of the electronic device away from the content presentation companion device, the one or more processors causing the communication device to transmit other user interface adjustment signals to the content presentation companion device that dynamically again modify the user interface feature being presented on the primary display as a function of the another distance.

16. The electronic device of claim 12, further comprising a motion detector detecting movement of the electronic device in three-dimensional space, the user interface adjustment signals causing motion of the magnifying element along the primary display as a function of the distance and in proportion to the movement of the electronic device in three-dimensional space.

17. The electronic device of claim 12, the user interface feature comprising a font size presented at the primary display.

18. The electronic device of claim 12, the user interface feature comprising a size of a window being presented at the content presentation companion device.

19. A system, comprising:

an electronic device comprising an ultra-wideband component, a communication device, and one or more processors; and a content presentation companion device electronically in communication with the electronic device and comprising another ultra-wideband component;

the one or more processors identifying a distance between the electronic device and the content presentation companion device by processing signals from the ultra-wideband component and causing the communication device to adjust a presentation characteristic of content streaming through the electronic device and then being presented at the content presentation companion device as a function of the distance by presenting a virtual magnifying glass on the content presentation companion device and magnifying portions of the content situated within a perimeter of the virtual magnifying glass while leaving other portions of the content that are complementary to the portions of the content unmagnified;

an angle of arrival sensor determining an angle between the communication device and a major surface of the content presentation companion device; and a motion detector detecting motion of the electronic device in three-dimensional space;

the one or more processors controlling speed of motion and distance of motion of the virtual magnifying glass in response to the motion of the electronic device in the three-dimensional space in as a function of the distance and angle.

20. The system of claim 19, further comprising superimposing the virtual magnifying glass atop content on the content presentation companion device.

* * * * *